Sept. 4, 1951 H. P. LUHN 2,566,947
ELECTRICAL MULTIPLYING AND DIVIDING MACHINE
Filed Jan. 16, 1948 17 Sheets-Sheet 1

INVENTOR
HANS P. LUHN
BY William Lang
ATTORNEY

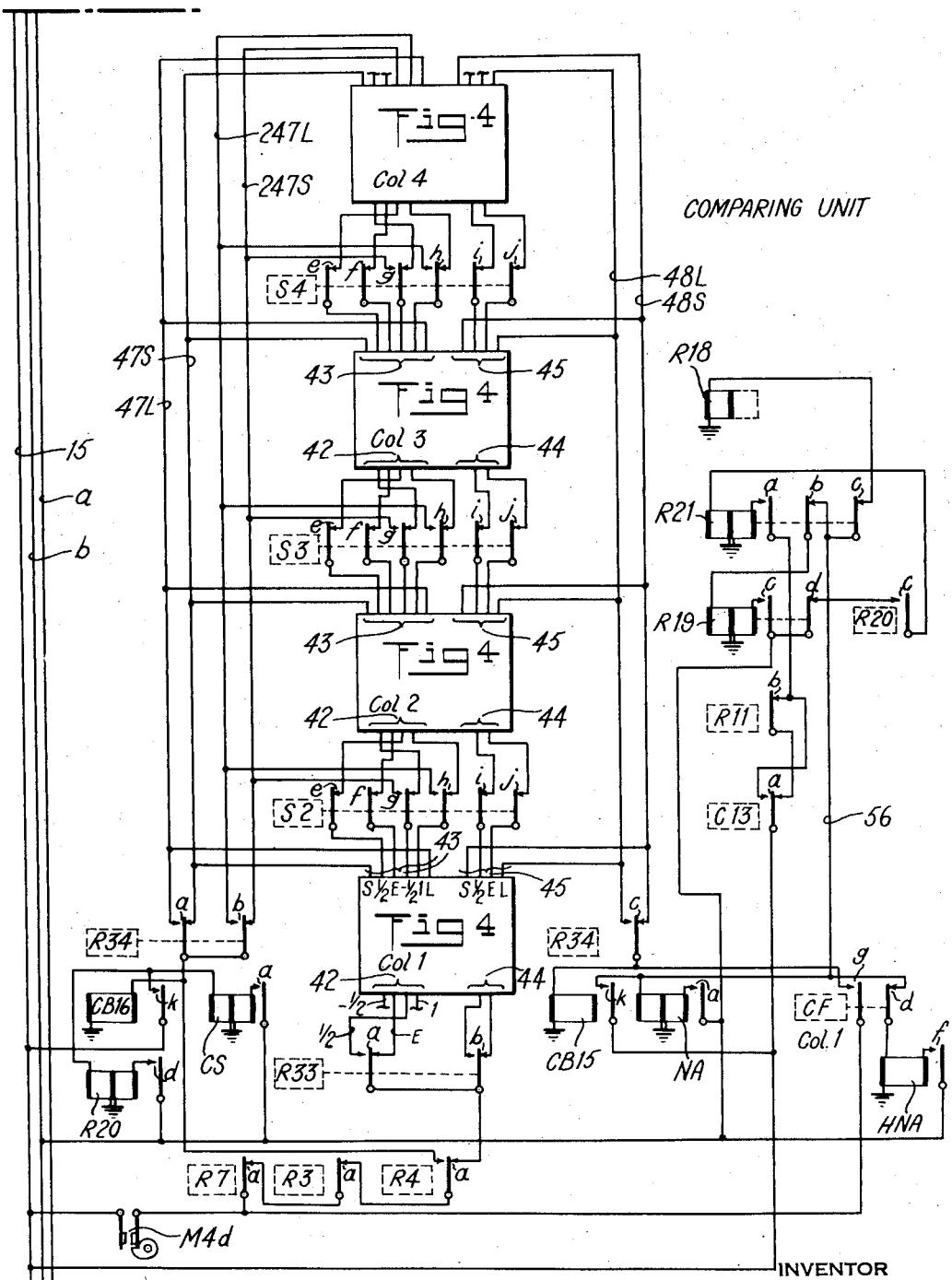

Sept. 4, 1951 H. P. LUHN 2,566,947
ELECTRICAL MULTIPLYING AND DIVIDING MACHINE
Filed Jan. 16, 1948 17 Sheets-Sheet 5

INVENTOR
HANS P. LUHN
BY
ATTORNEY

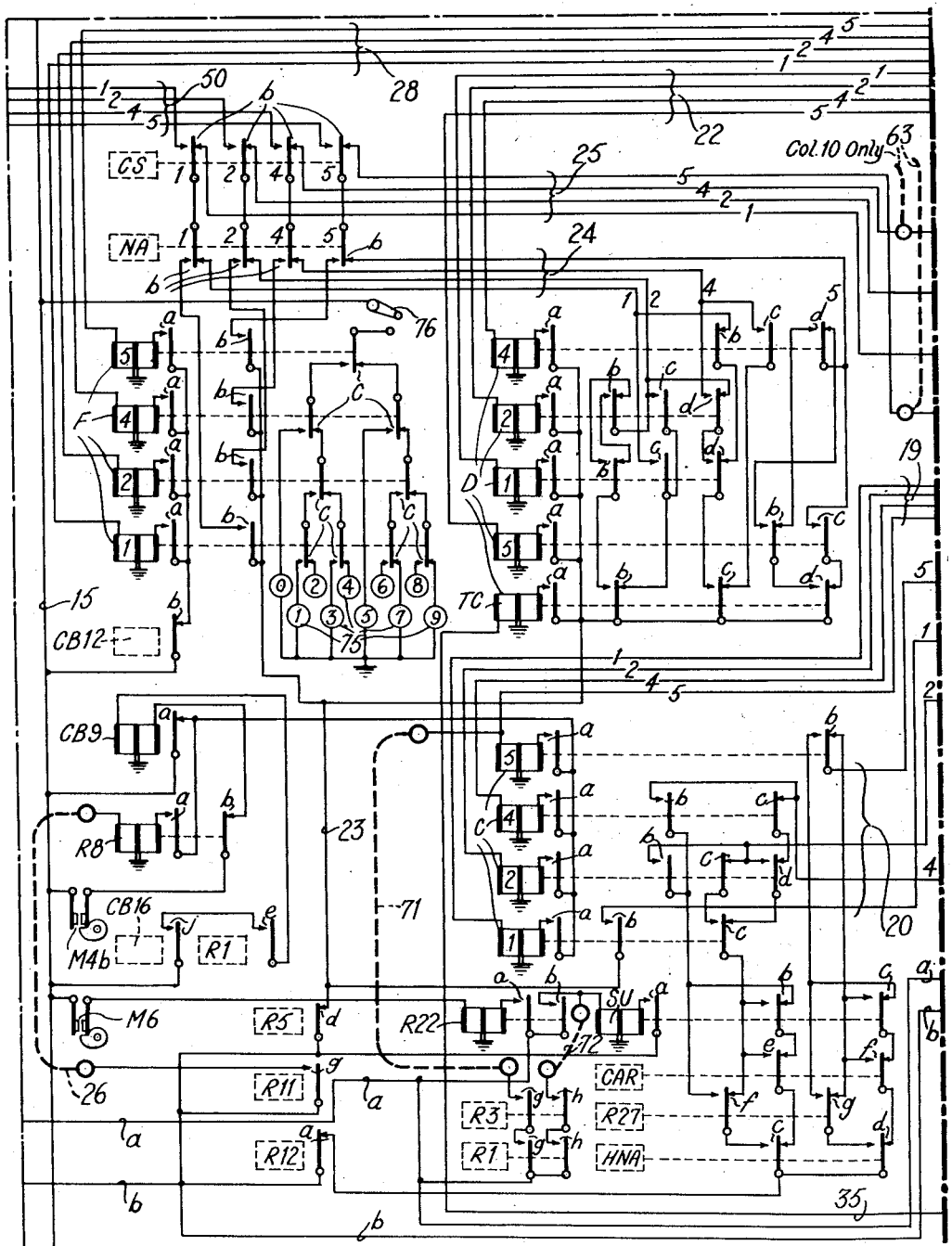

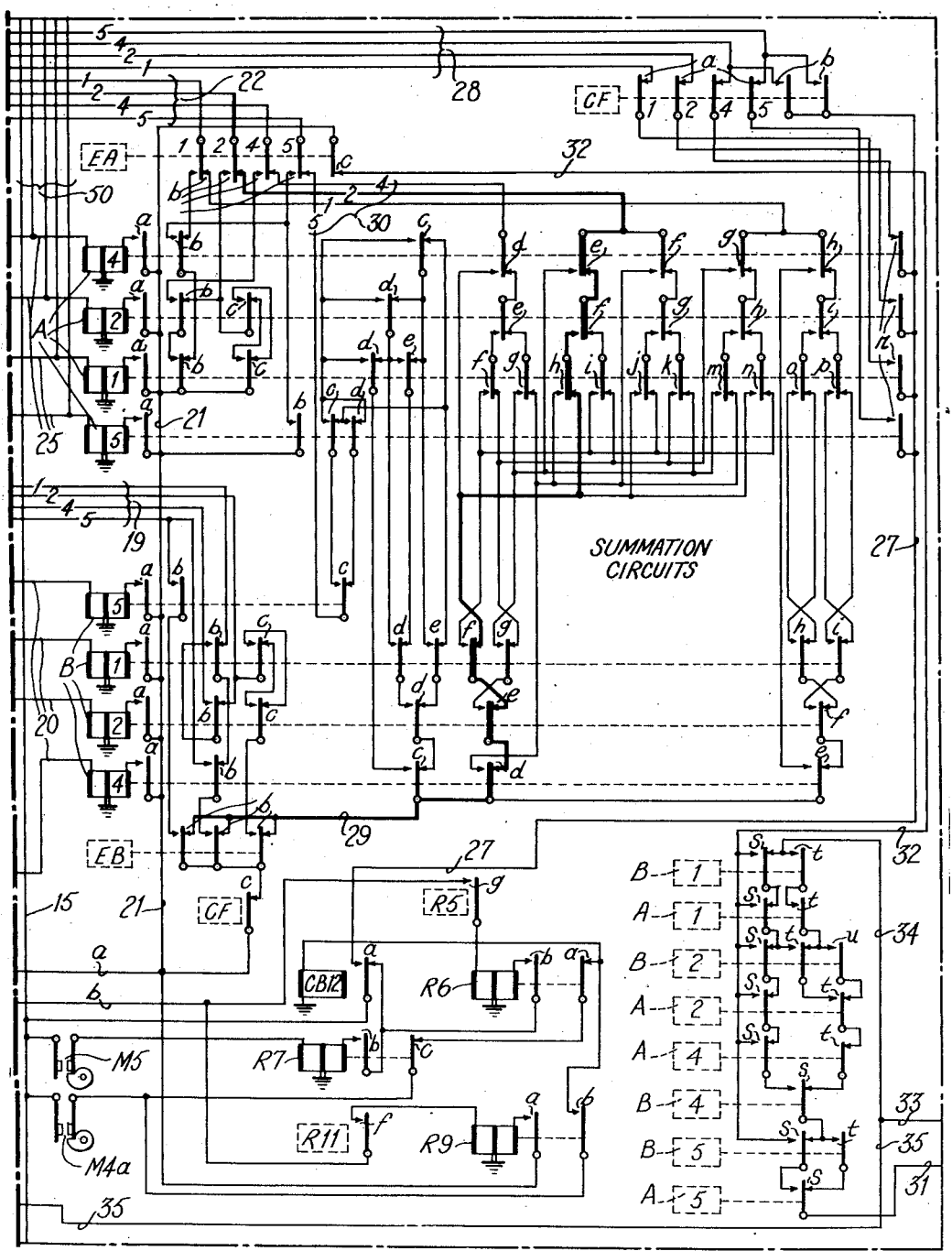

Sept. 4, 1951 H. P. LUHN 2,566,947
ELECTRICAL MULTIPLYING AND DIVIDING MACHINE
Filed Jan. 16, 1948 17 Sheets-Sheet 9

INVENTOR
HANS P. LUHN
BY William Lang
ATTORNEY

Sept. 4, 1951 H. P. LUHN 2,566,947
ELECTRICAL MULTIPLYING AND DIVIDING MACHINE
Filed Jan. 16, 1948 17 Sheets-Sheet 11

Sept. 4, 1951  H. P. LUHN  2,566,947
ELECTRICAL MULTIPLYING AND DIVIDING MACHINE
Filed Jan. 16, 1948  17 Sheets-Sheet 12

$$\frac{518}{793} \times 419 = 273.607 \text{ (Correct for a 3 place Quotient)}$$

$$.653 \times 419 = 273.607$$

| | | | | | | |
|---|---|---|---|---|---|---|
| 0 | a | + 518 | 000 | 0 | Dd <½Dn | |
| | b | -793 | +419 | 1 | Dd <1½Dn | SHIFT |
| 11 | a | + 518 | 000 | 0 | Dd <½Dn | |
| | b | -793 | +419 | 1 | Dd <1½Dn | SHIFT |
| 12 | a | + 518 | 000 | 0 | Dd <½Dn | |
| | b | -793 | +419 | 1 | Dd <1½Dn | SHIFT |
| 13 | a | +518 | 000 | 0 | Dd >½Dn | ADD |
| | b | -793 | +419 | 1 | Dd <1½Dn | SHIFT |
| 14 | a | -275.0 | +419 | +1.0 | Dd >½Dn | ADD |
| | b | + 793 | - 419 | - 1 | Dd >1½Dn | |
| 15 | a | -195.7 | +377.1 | + .9 | Dd >1½Dn | ADD |
| | b | + 793 | - 419 | - 1 | Dd >1½Dn | |
| 16 | a | -116.4 | +335.2 | + .8 | Dd >½Dn | ADD |
| | b | + 793 | - 419 | - 1 | Dd <1½Dn | SHIFT |
| 17 REMAINDER | | - 37.10 | +293.30 | + .70 | Dd >1½Dn | ADD |
| | | + 793 | - 419 | - 1 | Dd >1½Dn | |
| 18 | a | - 29.17 | +289.11 | + .69 | Dd >1½Dn | ADD |
| | b | + 793 | - 419 | - 1 | Dd >1½Dn | |
| 19 | a | - 21.24 | +284.92 | + .68 | Dd >1½Dn | ADD |
| | b | + 793 | - 419 | - 1 | Dd >1½Dn | |
| 20 | a | - 13.31 | +280.73 | + .67 | Dd >1½Dn | ADD |
| | b | + 793 | - 419 | - 1 | Dd >1½Dn | |
| 21 | a | - 5.38 | +276.54 | + .66 | Dd >½Dn | ADD |
| | b | + 793 | - 419 | - 1 | Dd <1½Dn | SHIFT |
| 22 REMAINDER | + | 2.550 | +272.35 | + .650 | Dd >1½Dn | ADD |
| | - | 793 | + 419 | + 1 | Dd >1½Dn | |
| 23 | a | + 1.757 | +272.769 | + .651 | Dd >1½Dn | ADD |
| | b | - 793 | + 419 | 1 | Dd >1½Dn | |
| 24 | a | + .964 | +273.188 | + .652 | Dd >½Dn | ADD |
| | b | - 793 | + 419 | + 1 | Dd <1½Dn | SHIFT |
| 25 REMAINDER+ | | .1710 RESULT | +273.607 | + .6530 QUOTIENT | | |

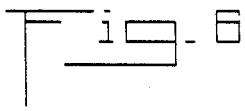
Fig. 6

INVENTOR
HANS P. LUHN
BY
William Lang
ATTORNEY

518 × 419 = 217042

| | | | | | | |
|---|---|---|---|---|---|---|
| 0 | a | +---518 | | 000 | }Dd<½Dn | { |
| | b | -1----- | | +419--- | }Dd<1½Dn | { SHIFT |
| 11 | a | + 518 | | 000 | }Dd<½Dn | { |
| | b | - 1---- | | + 419-- | }Dd<1½Dn | { SHIFT |
| 12 | a | + 518 | | 000 | }Dd>½Dn | { ADD |
| | b | - 1--- | | + 419- | }Dd<1½Dn | { SHIFT |
| 13 | a | - 482 | | 419- | }Dd>½Dn | { ADD |
| | b | + 1-- | | - 419 | }Dd>1½Dn | { |
| 14 | a | - 382 | | 3771 | }Dd>½Dn | { ADD |
| | b | + 1-- | | - 419 | }Dd>1½Dn | { |
| 15 | a | - 282 | | 3352 | }Dd>½Dn | { ADD |
| | b | + 1-- | | - 419 | }Dd>1½Dn | { |
| 16 | a | - 182 | | 2933 | }Dd>½Dn | { ADD |
| | b | + 1-- | | - 419 | }Dd>1½Dn | { |
| 17 | a | - 82 | | 2514 | }Dd>½Dn | { ADD |
| | b | + 1-- | | - 419 | }Dd<1½Dn | { SHIFT |
| 18 | a | + 18 | | 2095 | }Dd>½Dn | { ADD |
| | b | - 1- | | + 419 | }Dd>1½Dn | { |
| 19 | a | + 8 | | 21369 | }Dd>½Dn | { ADD |
| | b | - 1- | | + 419 | }Dd<1½Dn | { SHIFT |
| 20 | a | - 2 | | 217461 | }Dd>½Dn | { ADD |
| | b | + 1 | | - 419 | }Dd>1½Dn | { |
| 21 | a | - 1 | | 217461 | }Dd>½Dn | { ADD |
| | b | + 1 | | - 419 | }Dd<1½Dn | { SHIFT |
| 22 | | 0 PRODUCT | | 217042 | | |

Fig.6a.

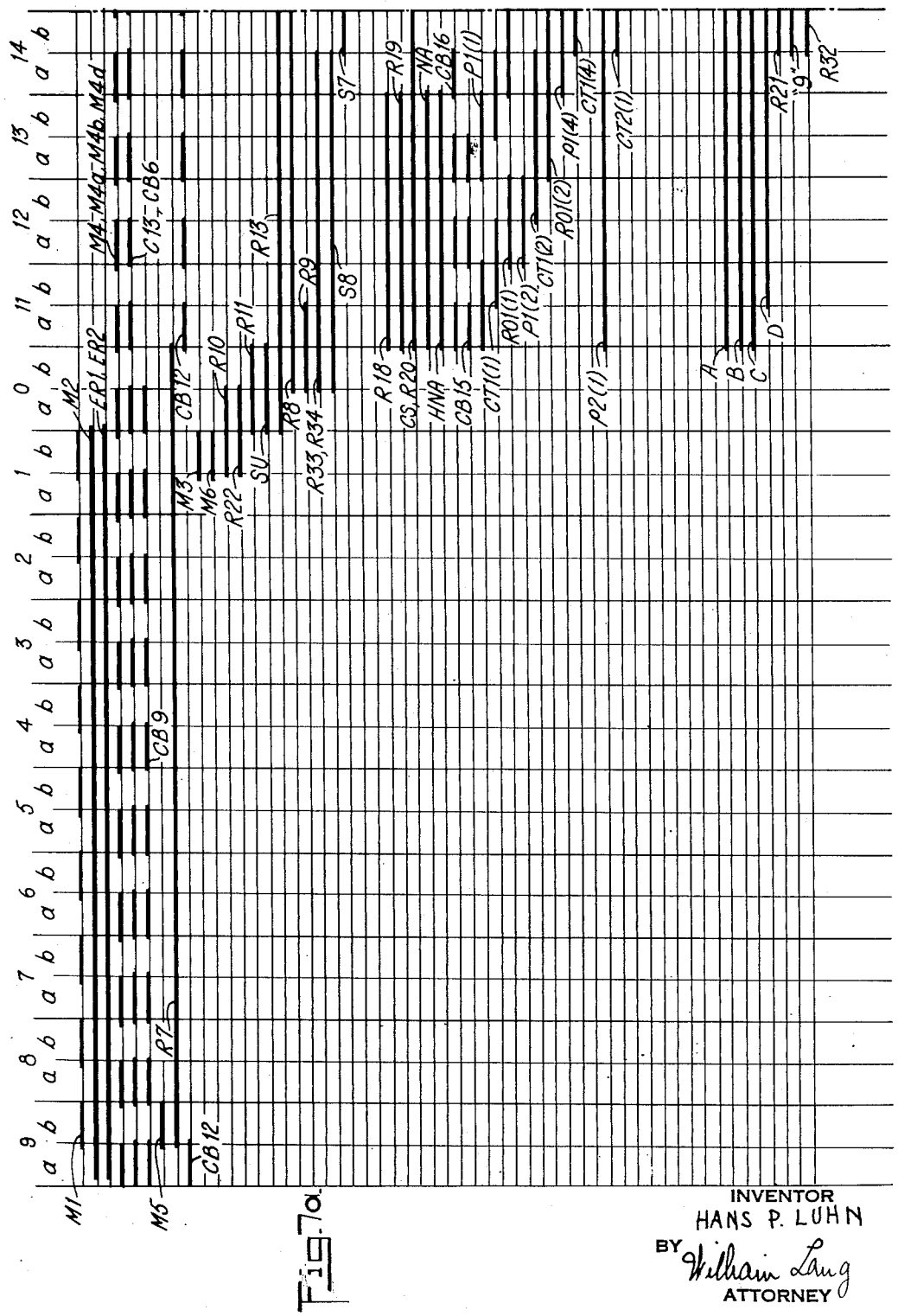

Sept. 4, 1951  H. P. LUHN  2,566,947
ELECTRICAL MULTIPLYING AND DIVIDING MACHINE
Filed Jan. 16, 1948  17 Sheets-Sheet 15

INVENTOR
HANS P. LUHN
BY William Lang
ATTORNEY

Sept. 4, 1951      H. P. LUHN      2,566,947

ELECTRICAL MULTIPLYING AND DIVIDING MACHINE

Filed Jan. 16, 1948      17 Sheets-Sheet 16

INVENTOR
HANS P. LUHN
BY William Lang
ATTORNEY

Sept. 4, 1951 H. P. LUHN 2,566,947
ELECTRICAL MULTIPLYING AND DIVIDING MACHINE
Filed Jan. 16, 1948 17 Sheets-Sheet 17

INVENTOR
HANS P LUHN
BY
William Lang
ATTORNEY

Patented Sept. 4, 1951

2,566,947

UNITED STATES PATENT OFFICE 2,566,947

ELECTRICAL MULTIPLYING AND DIVIDING MACHINE

Hans P. Luhn, Armonk, N. Y., assignor to International Business Machines Corporation, New York, N. Y., a corporation of New York Application January 16, 1948, Serial No. 2,777

26 Claims. (Cl. 235—61.7)

The present invention relates to calculating machines and more particularly to machines in which multiplication and division are performed.

The principal object of the invention is to provide an improved calculating mechanism which may be selectively utilized to perform multiplication or division to obtain a product or quotient respectively or which may be utilized to perform combined multiplication and division to obtain the result of an expression $$\frac{A}{B} \times C$$

A more specific object of the invention is to provide a relay type of calculating mechanism responsive to a series of electrical impulses wherein each alternate impulse will effect an algebraic summation of values set up on the relays.

A further object of the invention resides in the provision of relay devices settable to represent a dividend and a divisor and in which, in response to a single electrical impulse, a determination is made as to whether the dividend is equal to, less than, or greater than 1½ times the divisor.

A still further object resides in the provision of relay devices settable to represent a dividend and a divisor and in which, in response to a single electrical impulse, a determination is made as to whether the dividend is equal to, less than or greater than ½ the divisor.

Another object of the invention resides in the provision of a novel comparing mechanism in which two numbers may be set up with either one in the form of a complement and the other in the form of a true number, and in which in response to a single electrical impulse the relative magnitude of one with respect to 1½ times the other is ascertained.

Another object of the invention resides in the provision of a novel comparing mechanism in which two numbers may be set up with either one in the form of a complement and the other in the form of a true number, and in which in response to a single electrical impulse the relative magnitude of one with respect to ½ the other is ascertained.

A further object of the invention is to provide a dividing mechanism of the over-and-over subtraction type having column shift devices controlled in accordance with the relative magnitude of the dividend with respect to 1½ times the divisor.

A still further object is to provide a calculating mechanism of the relay type wherein a dividend is repeatedly reduced by the divisor or a multiple thereof and in which a multiplier or a multiple thereof is concurrently and correspondingly entered into an adding device to obtain the sum thereof.

Another object of the invention is to provide a set of relays in which a digit may be represented in combinational form and in which a digit represented in decimal form may be entered by setting the relays to represent the digits 0, 1, 2, etc. in turn and interrupting the setting after a number of setting steps equal to the value of the digit.

A further object of the invention is to provided an improved relay summation apparatus in which three sets of relays are provided, amounts set up on two of the sets are added, and entered into the third set in response to a single electrical impulse, and a second impulse will transfer the sum in the third set back to one of the first two. The arrangement provides for maintaining the setting of the first two sets of relays until the retransfer and then dropping out the relays not required in the new setting. This results in greater operating speed as no separate clearing step is necessary.

Another object of the invention is to provide a single calculating apparatus in which two amounts may be entered and in which by the simple setting of a single switch the apparatus will obtain either the quotient of one of the amounts divided by the other or the product of the two.

Other objects of the invention will be pointed out in the following description and claims and illustrated in the accompanying drawings, which disclose, by way of example, the principle of the invention and the best mode, which has been contemplated, of applying that principle.

In the drawings:

Figs. 1, 1a, 1b, 1c, 1d and 1e arranged vertically in the order named constitute a wiring diagram of the electric circuits of the apparatus.

Figs. 2 and 3 placed side by side constitute a wiring diagram of the circuits embodied in one denominational order of the apparatus. The wiring of Figs. 2 and 3 is represented by rectangles designated Fig. 2 and Fig. 3 in Fig. 1a.

Fig. 4 is a wiring diagram of one denominational order of the comparison device and in Fig. 1c it is represented by rectangles to indicate that several such orders are provided and interconnected as shown.

Figs. 5 and 5a taken together illustrate graphically the settings of the several sets of relays throughout the succession of steps of operation involved in the solution of a combined multiplying and dividing problem.

Fig. 6 is a diagram illustrating the mathematical procedure involved in the solution of a problem of combined multiplying and dividing and also dividing solely.

Fig. 6a is a similar diagram for multiplying alone.

Figure 7B:
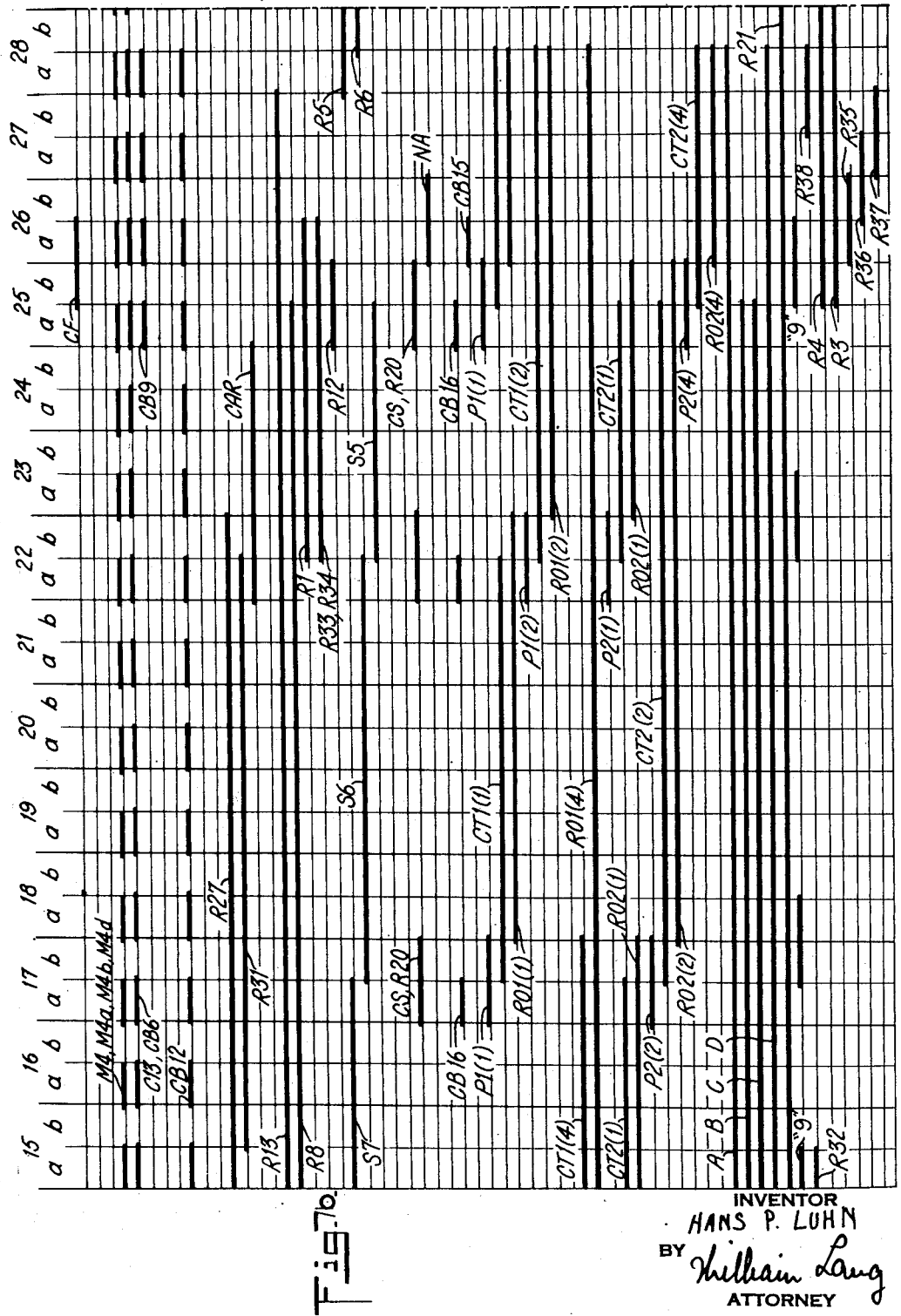

Figs. 7a and 7b taken together constitute a timing diagram of the several relays and circuit closing devices involved in the sequence of operation during the solution of a selected problem.

Figs. 8, 8a, 9, 9a are diagrams facilitating the explanation of the ½ comparison device.

Figs. 10, 10a, 10b and 10c are diagrams facilitating the explanation of the 1½ comparison device.

General principles of operation

In order to explain the sequence of operations, a specific problem will be taken and the various steps required to arrive at a solution will be set forth in detail in connection with the circuit diagram and the timing chart (Fig. 7a, 7b). The problem chosen is $$\frac{518}{793} \times 419$$

In effect, the machine will divide 518 by 793 correct to a predetermined number of places and attain the product of this quotient times the value 419, which is 273.607. The dividing operations are carried out by a modified form of over-and-over subtraction, and the multiplying operations are carried out by a modified form of over-and-over addition with the two computations taking place concurrently.

Referring to Fig. 6, the mathematical steps involved in the process are set forth for manual computation and the several steps are identified by numbers along the left hand margin of the figure. The first three steps designated 0, 11 and 12 represent preliminary steps taken by the machine to initially align the dividend 518 and the divisor 793 in the relationship indicated in step 13, which indicates that the divisor is to be substracted from the dividend. It will be noted in this example that the divisor is larger than the dividend. In the usual form of over-and-over subtraction method, this subtraction would be performed but a column shift would first be effected.

In accordance with the principles employed in the present invention, the subtraction as indicated at step 13 is carried out algebraically to obtain the negative difference 275 at step 14. Before this subtraction is effected, the two factors are inspected or compared to determine whether the dividend is greater, equal to or less than ½ the divisor and also whether the dividend is greater, equal to or less than 1½ times the divisor. Where, as in the present case, the dividend is greater than ½ the divisor but is less than 1½ the divisor, it is a signal that the indicated subtraction is to be performed algebraically and that a column shift of the divisor to the right is to follow, so that at step 14 the negative remainder which might be said to represent an overdraft is to have added thereto an increment representing .10 of the divisor (due to the column shift). The comparison at step 14 indicates that now the dividend is greater than 1½ the divisor and also obviously greater than ½ the divisor which is a signal that the algebraic addition is to occur without the subsequent column shift, so that at step 15 the overdraft has been reduced to 195.7 and a second reduction occurs, reducing it to 116.4 followed by a third reduction reducing the value to 37.1.

It will be noted that this value 37.1 represents the dividend reduced by seven times the divisor with an overdraft of 37.1 and is the same result that would have been attained by repeatedly subtracting 793 seven times with an initial column shift. It is apparent, therefore, that in accordance with the present method the divisor is first subtracted one unit and then added back .3 of a unit with a net reduction of .7.

Inspection will show that, if the divisor were subtracted again with the preceding denominational relationship, the net result would be to reduce the dividend by 6 times the divisor with a positive remainder of 43.2. If this step is carried out, it would have to be followed by a column shift operation before further reduction could take place. With the present method the shift requirement is anticipated in the following manner. At step 16 it is determined that the dividend is greater than ½ the divisor but is less than 1½ times, this being a condition similar to that for step 13 and calls for adding followed by a shift operation. The 1½ comparison in effect discovers at this time that, when the algebraic summation occurs, the remainder must be such that a shift will be required. Therefore, it anticipates and calls for the shift so that at step 17 the divisor is shifted one further step to the right to reduce the dividend by .01 of the divisor. Comparison at this and the several following steps shows the dividend to be greater than 1½ the divisor, so that according to the rule, algebraic summation takes place to repeatedly reduce the remainder 5 times, resulting in the value 2.55 at step 22. This is the same result that would have been obtained if the divisor had been subtracted 6 times with an initial column shift of 5 more times with a further column shift.

At step 21 the inspection again indicated the dividend to be greater than ½ the divisor but less than 1½ times the divisor and calls for a column shift after the summation, which is represented at step 22 and is followed by two more reducing operations to obtain the remainder .171 after a shift is called for by the comparison or inspection at step 24.

In the foregoing manner, the dividend is reduced through algebraic summation determined by inspection of the factors, and following the simple rule that, whenever the dividend is greater than 1½ times the divisor, summation occurs without column shift and, where comparison indicates that the dividend is greater than ½ the divisor but less than 1½ times the divisor (that is, it lies somewhere between these two values of the divisor), summation is to occur and to be followed by a column shift.

It may occur, due to the relationship of the values, that at some comparison step the dividend is found to be less than ½ the divisor, in which case the column shift alone is called for as exemplified in the 0, 11 and 12 steps, so that after the initial factors have been aligned at step 13 the procedure thereafter will be in accordance with the three rules to bring about adding (algebraic summation) with accompanying shift; adding alone; or shifting alone.

In Fig. 6, the manner in which the result 273.607 is obtained is indicated in the central column of figures, where the multiplier is initially positioned in correspondence with the positioning of the divisor and where the multiplier is accumulated additively for each subtraction of the divisor and subtracted for each addition of the divisor with corresponding column shifting. Thus, at step 13 the negative 793 has an accompanying positive 419 which added to 0 results in a value representing 419 times the quotient digit 1.

After column shift at step 14, there is represented subtraction of 419 three times, at steps 14, 15 and 16 leaving the result at step 17 of 293.30 which represents 419 times the quotient of .70 at this point with the negative remainder of 37.10. Subsequent column shift and subtraction of 419 five times at steps 17, 18, 19, 20 and 21 results in 272.35 at step 22 which represents 419 times the quotient .65 with the remainder 2.55, and finally after column shift and three more steps the ultimate value 273.607 at step 25 represents the quotient .653 times 419 with the remainder .171.

The right hand column of figures in Fig. 6 represents the corresponding steps with a multiplier of 1, and it will be noted from inspection that this will result in attaining the quotient .653 as such. It may be stated at this point in the operation of the machine, where a straight dividing operation is to be performed the multiplier is in effect given the value of 1, so that the result then becomes the quotient.

Following a similar procedure, if the divisor is given the value of 1, the result will be the product of what has been called the dividend times the multiplier. This is illustrated in Fig. 6a where the value 1 is substituted for the divisor 793 of Fig. 6 and from inspection and following the rules explained, it will be noted that multiplication involves over-and-over subtraction of 1 from one factor accompanied by over-and-over addition of the other until the first is reduced to zero. Column shift is anticipated when the reduced factor becomes less than 1½ times 1000, 100 or 10 as the case may be.

By means of the principles followed, the same computing structure may be employed and will operate in the same manner to effect multiplying, dividing or combined multiplying and dividing.

*The method of computation as applied to the machine*

Figure 1:
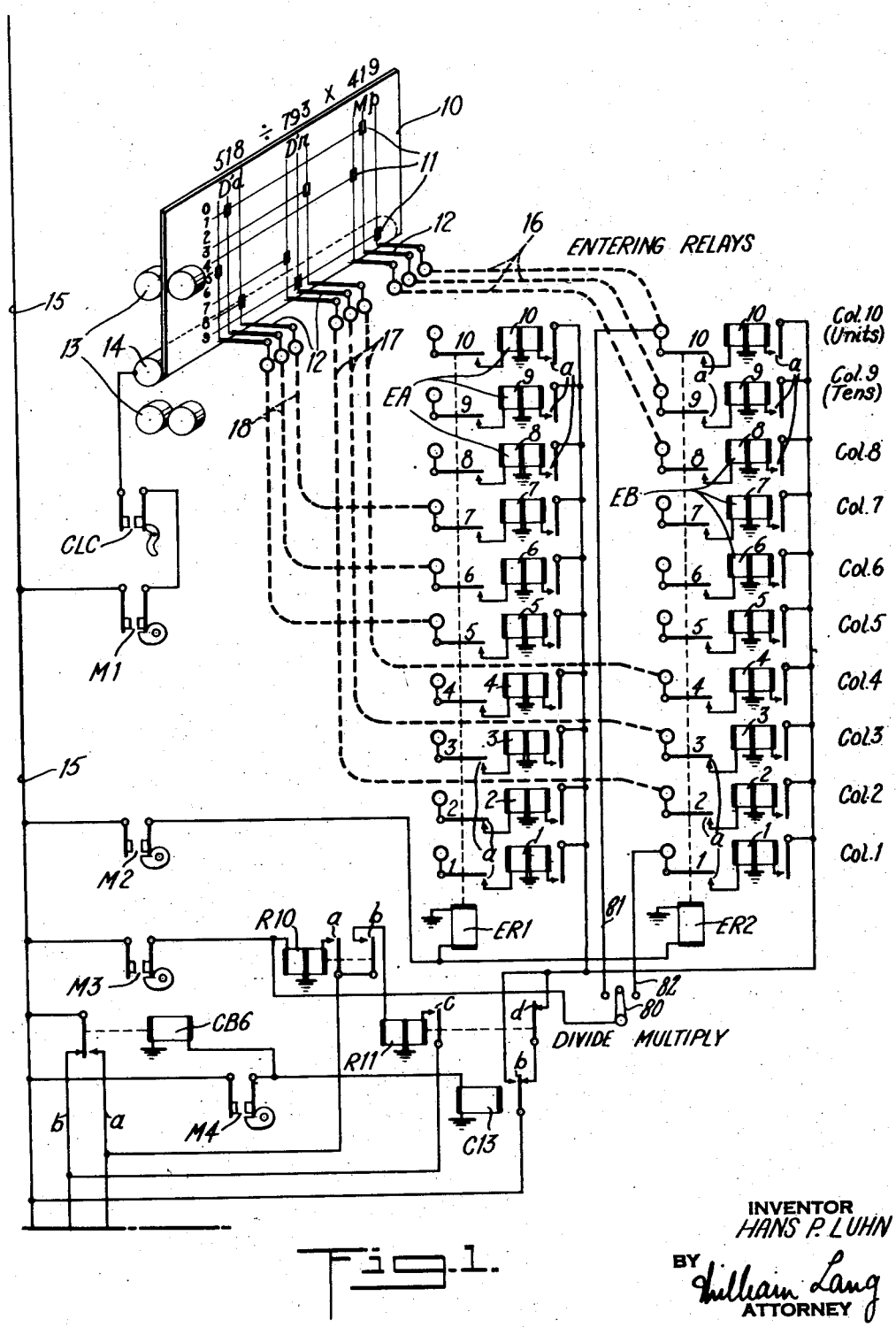
Figure 5:
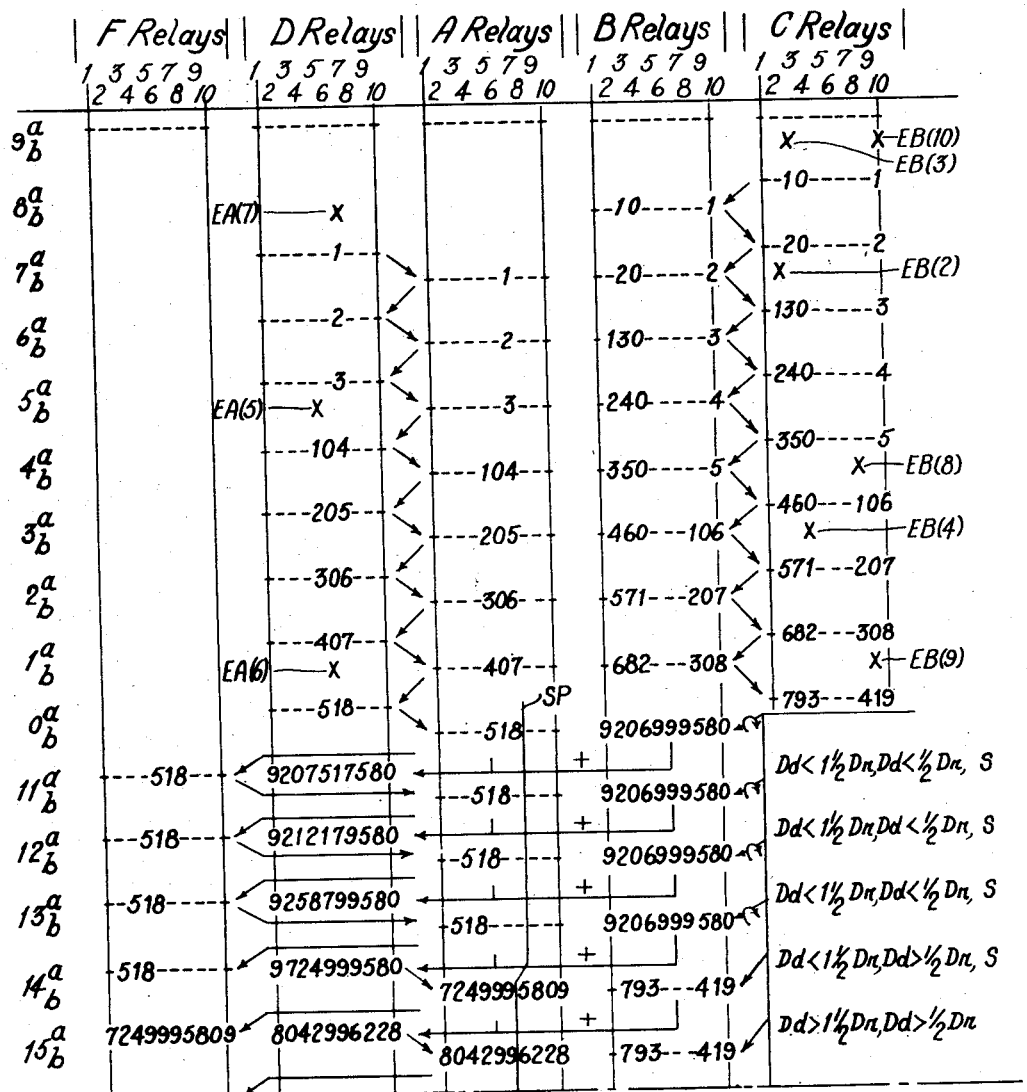
Figure 5A:
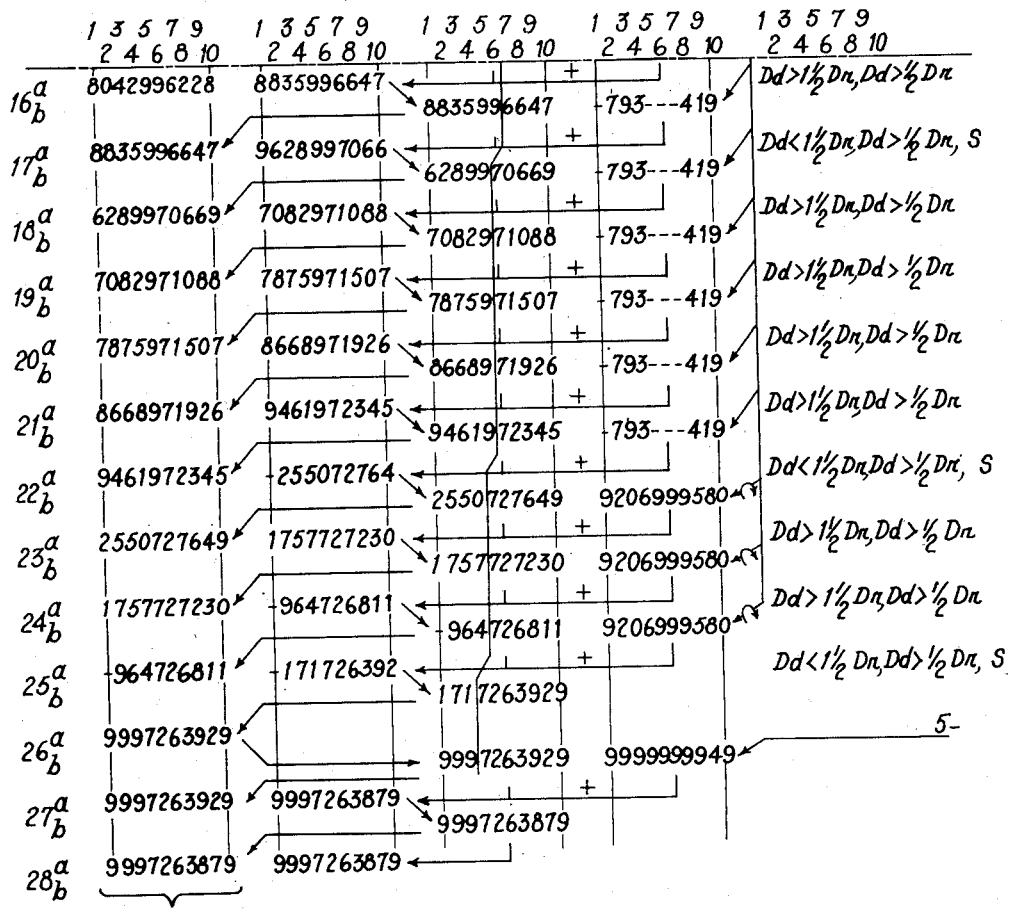

Figs. 5 and 5a represent in a diagrammatic manner sets of values entered into relays designated as A, B, C, D and F relays which are arranged to receive values and transfer them from one set to another, during successive steps of operation of the machine. These steps are identified along the left hand margin as beginning with step designated 9 and continuing with 8, 7, etc., with sufficient steps provided to take care of the requirements for the chosen machine capacity. The factors are derived from a data source in the form of the well known perforated record card which is provided with columns and rows of perforating positions as shown in Fig. 1. This card traverses sensing brushes 12 so that designations representing 9 are sensed at the 9 step or point in the cycle, those representing 8 are sensed in the 8 time and so on.

Referring back to Fig. 5, certain columnar relay positions have X marked therein. This represents the point of time in the cycle at which a perforation is sensed in a related card column and effects an entry in the corresponding set of relays. Through circuits to be explained in detail, the C relays will receive impulses in response to sensing of the divisor and multiplier values 793 and 419 respectively and through a system whereby values are transferred from the C relays to B relays and back again will set up these factors in the C relays at the 0 time in the cycle. Likewise, the D relays will receive the impulses from the card representing the dividend and through transfer back and forth with the A relays, will obtain the dividend 518 at the 0 time in the cycle, which corresponds to the 0 time in Fig. 6.

In the operation of the machine, each cycle or step of operation is divided into two parts designated the $a$ and $b$ parts, and provision is made for emitting impulses during the $a$ part and during the $b$ part which will hereinafter be designated $a$ and $b$ impulses. These impulses are directed through the circuit network to effect transfer of data from one set of relays to another; to effect summation of data standing in the A and B relays; to effect comparison between the data standing in the A relays and that standing in the B and C relays; and other incidental functions which will be pointed out as the explanation progresses.

After the factors are set up in the C and D relays, the machine will automatically and sequentially go through the mathematical steps explained in connection with Fig. 6. In handling the values, however, advantage is taken of the convenience offered in handling some of the values in their complementary form and in the chart Fig. 5 the complementary values are represented as they are set on the various sets of relays.

Referring particularly to the 0 step, it is indicated by an oblique arrow that the dividend 518 is transferred to the A relays in the position shown and concurrently (in response to a $b$ impulse) the divisor 793 and multiplier 419 are transferred from the C relays to the B relays in the form of 9's complements. Along line $a$ of step 11 is indicated that the summation of the amount in the A and B relays takes place with the result set up in the D relays, but this is in effect an idle operation. It is also indicated along the $a$ line of step 11 that a comparison takes place, which indicates that the dividend is less than ½ the divisor and therefore calls for a shift without summation. At the same time, the dividend value 518 is transferred from the A relays to the F relays from which it is transferred back to the A relays at the $b$ time in step 11 with a column shift toward the left.

At this point it is to be particularly noted, that in handling the values in the machine, instead of (as explained in connection with Fig. 6) shifting the divisor toward the right as is more customary, the dividend is shifted toward the left with the same relative effect.

Accompanying the shifted entry at the $b$ time in step 11, the divisor and multiplier are again entered in the B relays in complementary form and, since the comparison is the same as before, summation into the D relays is again effected with the dividend transferred to the F relays, and thence back to the A relays with another column shift. This procedure is repeated until at the $a$ part of step 14 it is ascertained that the dividend is greater than ½ the divisor but less than 1½ times the divisor, calling for summation and shifting. Thus, at the b time in step 14 the summation entered into the D relays will be transferred back to the A relays with a column shift to the left. At the same time, the multiplier and divisor are transferred in their true form to the B relays. At the b part of step 14 it will be noted that the divisor and multiplier are read out in their true value. This is controlled by the nature of the dividend remainder in such manner that, when this remainder is in the form of a complement, the other two factors are entered in true value and, when it is entered as a true value, they are read out in the form of complements. Thus, the summation indicated at the a portion of step 14 results in the complement corresponding to 275 in Fig. 6, which is transferred to the A relays with a column shift to the left, so that on the next summation at the a time of step 15 the summation is still a complement corresponding to the value 195.7 for the same step in Fig. 6.

In the machine, advantage is taken of the fact that the dividend becomes progressively smaller as the result or quotient increases, and the sets of A relays are provided with so-called denominational splitting devices whereby the units position may be progressively shifted to move the decimal point to the left at each shifting. This shifting of the decimal point is represented by the stepped line SP extending down through the A relays with the values to the left of the line representing the dividend and progressive remainders, and the final result to the right of this line, which result is expressed in the form of a complement.

If the remaining steps in Figs. 5 and 5a are followed in accordance with the procedure set forth in Fig. 6, it will be noted that the steps of operation as previously described are carried out in the corresponding operations, utilizing the complementary form, so that ultimately at step 25 the A relays contain the remainder 171 in the true value and the result in the form of a complement 726.3929. Again, if the value 1 is substituted for the multiplier 419, the procedure would have been terminated with the remainder 171 and value .653 expressed in the right hand section of the A relays as the complement 999.3469.

In step 26 it is represented that a 5 is entered (complementarily) in the B relays, for rounding the result. The transfer from the A relays to the F relays at the a part of step 26 drops the remainder, leaving only the result to which the 5 is added and ultimately set up in the F relays at step 28 from which it may be read out.

*Circuit diagram*

The circuit diagram will now be explained in detail with particular reference to the problem of Figs. 5 and 5a and the timing or sequence diagram (Figs. 7a and 7b) with the successive steps explained in the order in which events occur.

Figure 1A:
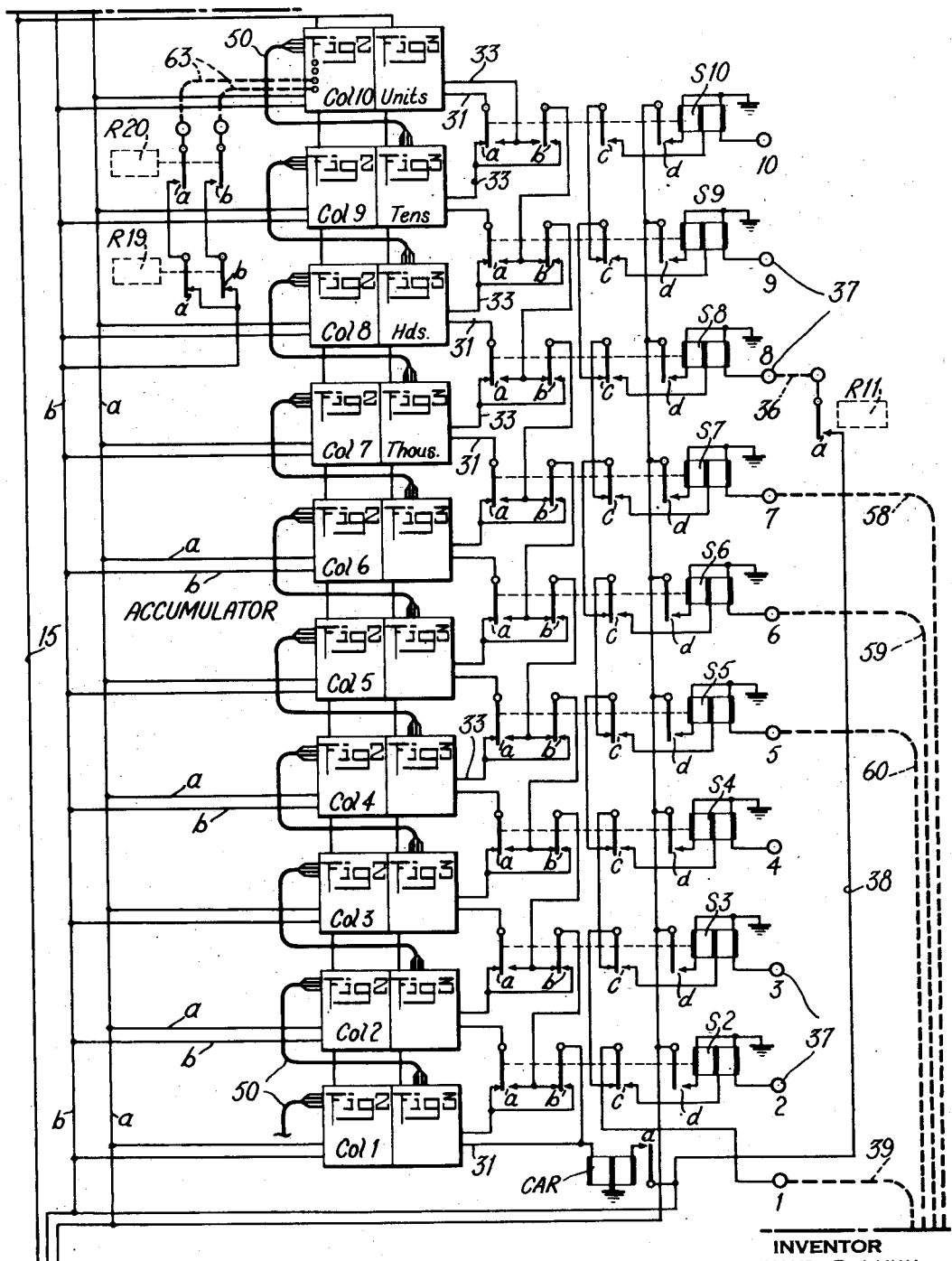

Figs. 1, 1a, 1b, 1c, 1d and 1e arranged vertically in the order named constitute the main circuit diagram which in Fig. 1a shows 10 columns of summation relays and controls therefor which are the same for each column or order. In each column the boxes labeled Fig. 2 and Fig. 3 include the relays and connections shown on these two figures, which are to be placed side by side, and repeated for the ten positions. In Fig. 1c are shown four boxes each designated Fig. 4, each of which contains wiring constituting an order of the comparing unit. This wiring also is repeated in each of the orders and is shown in detail in Fig. 4.

*Factor entry circuits.*—Referring to Fig. 1, the record card 10 is provided with fields in which the dividend, divisor and multiplier are represented by differentially located perforations 11 arranged in the well known manner to traverse sensing brushes 12, as the card is advanced downwardly with a uniform motion by well known card feeding devices represented diagrammatically by rollers 13. As a perforation passes a brush 12, it permits closure of a circuit therethrough between the brush and the common contact roller 14. Current is supplied to the contact roller from a line 15 extending from a suitable current source to a circuit breaker designated M1 timed to close as each index point position 9, 8, 7, etc. is at the sensing brushes, through card lever contacts CLC which are closed only while a card is traversing the brushes. The timing diagram in Fig. 7a indicates the periods during which the contacts M1 are closed.

Referring to the timing chart, the steps of operation are designated as 9, 8, 7, 6, etc. and each step is divided into an a and b part with the M1 impulses occurring during the b part of the steps. For the example chosen, the 9's in the divisor and multiplier will be sensed first during the b part of step 9 completing a circuit from line 15, contacts M1, CLC, roller 14, 9 hole (units order of the multiplier value), plug connection 16, a pair of a contacts of relay ER2, winding of number 10 entering relay EB to ground. Concurrently, a parallel circuit extends from roller 14 through the 9 hole of the divisor tens digit, connection 17 to the a contacts numbered 3 of relay ER2 and the winding of the 3 relay EB to ground. The relay ER2 as well as relay ER1 is in energized condition at this time through a circuit closed by contacts M2 (see Fig. 7a) which are timed to be closed during the period when the perforations 9—1 are sensed.

The EB relays will close their a contacts to provide holding circuits traceable from ground to the second windings of the relays, their a contacts, d contacts of relay R11, b contacts of relay C13 to line 15. Relay C13 is a circuit breaker controlled through master contacts M4 which close repeatedly near the end of each b period and open just before the end of the following a period, so that relay C13 is energized at such times to shift its contacts b. It is to be particularly noted that this relay is of the make-before-break type so that, when the b contacts shift, they will make the open circuit before breaking the closed circuit. Thus, when b contacts of relay C13 shift from the position shown in Fig. 1, in response to energization in the a part of step 8, they will pick up the hold circuit for the energized EB relays and continue to hold the same. Then when the relay C13 deenergizes, the holding circuit will be transferred back through the normally closed contacts, and in this manner the energized EB relay will be maintained until later in the cycle when the d contacts of relay R11 open.

Similarly, as the other perforations 11 in the divisor and multiplier fields of the card are sensed by their related brushes 12, circuits will be completed to energize entering relays EB and the perforations for the dividend will complete circuits through connections 18 to similarly energize the entering relays designated EA. The connections 16, 17 and 18 are made as a preliminary to the procedure to direct the multiplier into the positions 8, 9 and 10 and the other two factors as indicated. Thus, the EA and EB relays are energized at differential times in accordance with the digital values sensed and their holding circuits will be maintained until the 0 step when the d contacts of R11 are opened as will be explained.

*Factor converting circuits.*—Referring now to Fig. 3, when any EB relay is energized, it shifts contacts designated b which are wired to contacts designated b and c of a group of relays designated B. There is a set of four B relays for each denominational order of which ten are provided, and in each order the four relays are designated with the values 1, 2, 4, 5 which, when energized singly or in combination, represent the digits 1 to 9.

The factors which are represented in a decimal notation on record card 10 are to be converted to this combinational notation, and this is done by causing the set of four relays to receive unit entries, that is, count from 0 to the digit to be represented. The counting procedure is initiated at differential times upon sensing of the card perforation and terminated at a fixed time, so that the extent of the count is in accordance with the digital value sensed in the card. Initially, the combinational relays B are deenergized so their contacts are in the positions shown. From the contacts of the B relays a set of wires 19 extends (Fig. 2) over to the group of relays designated C, of which there is a set of four for each of the ten denominational orders and which also have the values 1, 2, 4 and 5.

Referring to Fig. 1, relay CB6 is energized repeatedly through contacts M4 during the a impulse periods of each step of operation to shift its contacts of the make-before-break type, so that current is directed from line 15 alternately to a pair of wires designated a and b with a slight overlap, so that the circuit to one is made before it is broken for the other. These a and b wires extend across the circuit figures and branch to various relays and circuit networks as will be explained. Specifically, in Fig. 1a the a and b wires extend to all the Fig. 2 boxes and in such figure itself they are shown as entering at the lower left hand corner and extending over to Fig. 3, where the a wire extends through c contacts of a relay CF to the b contacts of relay EB.

Since, as explained, the EB relay is energized during a b impulse period in a step of operation, the next following a impulse through wire a occurring in the next step will complete a circuit to enter a 1 on the C relays as follows.

The operation can best be explained by assuming a particular example and tracing the circuits in connection therewith. Let it therefore be assumed that a 9 hole is sensed and has energized the EB relay of Fig. 3 at the b part of the 9 step. At the next following a part of step 8, a circuit is traceable from the a wire, c contacts of relay CF, the central pair of b contacts of relay EB (shifted), through the b contacts of the 4 and 1 relays B (normal) to the 1 wire 19 (Fig. 2), and the 1 relay C to ground. The b contacts of relay EB are so wired through the contacts of the B relays that the impulse from the a wire will be transmitted to the wires 19 in accordance with a digital value one unit higher than the setting of the contacts related to the B relays.

The energized C relay (Fig. 2) will close its a contacts to provide a holding circuit through the a contacts of relay CB9 to line 15. The relay CB9 is repeatedly energized through contacts M4b and normally closed b contacts of relay R8, so that the relay CB9 is energized during each a portion of a step and consequently its a contacts are opened during the a impulse period and closed during the b period. Consequently, the C relay energized through an impulse at the a part of the step, which will hereinafter be termed an a impulse, will accordingly be held through the next following b time when relay CB9 is in deenergized condition.

During this following b impulse time, a circuit extends from the a wire (Fig. 2) through d contacts of relay R5, b contacts of the 1 relay C (now closed) and the 1 wire of a group designated 20 (Fig. 3) to the 1 relay B and ground. In this manner the 1 which was entered in the C relays is transferred back to the B relay designated 1, which closes its a contacts to provide a holding circuit to wire 21, and the a impulse wire. The energizing impulse, as stated, occurs at the b time and held slightly over into the following a time and maintained through the following a impulse period.

From this point on, the shifting of impulses between the a and b wires will send a second a impulse through the b contacts of relay EB to transmit the setting on the B relays increased by one unit over to the C relays. Specifically, with the 1 relay B energized, the circuit is traceable from the a wire, c contacts of relay CF, the right hand b contacts of relay EB (shifted), c contacts of the 2 relay B (normal), c contacts of the 1 relay B (shifted), the 2 wire 19 (Fig. 2) and the 2 relay C to ground. As before, the C relay will be held energized through the following b impulse period via the a contacts of relay CB9 during which a retransferring circuit is completed to transfer the 2 back to the B relays through a circuit traceable from the b wire (Fig. 2), a contacts of relay R12 (normal), c contacts of relay HNA, e contacts of relay CAR, b contacts of relay SU, b contacts of the 2 relay C (now closed, and thence through the 2 wire so (Fig. 3) to the 2 relay B, which as before provides its own holding circuit which will maintain the relay energized during the following a impulse period. During this latter period, the a wire sends another a impulse through the circuit network to transfer a 3 to the C relays, the 3 being represented as a 2 and a 1, the impulse being directed over the 1 and 2 wires 19 as follows.

For the 1 part, it is traceable from the a wire, c contacts of relay CF, central b contacts of relay EB, b contacts of the 4 and 1 B relays to the 1 wire 19 and thence to the 1 relay C. For the 2 part, the circuit is traceable through the right hand b contacts of EB, the c contacts of the 2 relay B (shifted), the c contacts of the 1 relay B to the 2 wire 19 and 2 relay C. Again, these two relays are held during the following b impulse period during which retransferring circuits will extend through the 1 and 2 wires 20 to energize the 1 and 2 relays B. These circuits will be the same as previously traced for the transfer of values 1 and 2, so that now the B relays contain the digit 3, and on the next a impulse the next higher digit 4 will be entered into the C relays. This circuit is traceable from the a wire, c contacts of relay CF, b contacts of central relay EB, b contacts of 4 relay B (normal), b contacts of the 1 relay B (shifted), b contacts of the 2 relay B (shifted), to the 4 wire 19 and over to the 4 relay C which in turn through its b contacts will transfer the 4 back to the B relays, and this relay will in turn at the next *a* impulse transfer a 5 to the C relays.

The transfer of the 5 circuit is traceable through the central *b* contacts of relay EB and the now shifted *b* contacts of the 4 relay directly to the 5 wire 19 and the 5 relay C. Inspection of the circuits already traced will show that this transfer and retransfer will continue with contacts of the B relays transmitting a unit higher value at each succeeding *a* impulse period, and on the next *b* impulse period the contacts of the C relays will transmit this advanced digit back to the B relays. This process continues until the EB relay is deenergized, which deenergization is brought about as follows.

Referring to Fig. 1, at the 1 time in the cycle contacts M3 close as indicated in the timing diagram (Fig. 7a) to energize relay R10 which closes its *a* contacts to set up a holding circuit through the *a* impulse wire so that the relay R10 is held through the next *a* part of step 0. Relay R10 closes its *b* contacts to in turn energize relay R11 which will close its *c* contacts wired to the *b* impulse wire, so that the relay R11 is picked up upon the energization of relay R10 and held after this relay deenergizes and until the *b* impulse is interrupted.

When relay R11 is energized, it opens its *d* contacts in the holding circuits of the EA and EB relays. At the time that these *d* contacts open (*a* impulse time), the relay C13 is energized through contacts M4 and the holding circuit is maintained by the *b* contacts (shifted) of this relay. However, as noted from the time chart, when relay C13 deenergizes at the beginning of the next *b* period, relay R11 will still be energized and its *d* contacts open, so that the holding circuit for the entering relays is broken at the beginning of the *b* impulse period of the 0 step. The extent of advance of the B relays is dependent on the time of initial energization of the entering relays. Thus, for example, if energized in response to a 9 hole in the card, the transfer cycles will have been repeated nine times to advance the B relays to a 9 setting at the time the holding circuit is broken. If energized in response to a 7 hole, transfer is repeated seven times and so on.

In Fig. 5, it is indicated under the heading "C Relays" by an X the point in the operation of the machine at which the digit representing perforations are sensed for controlling the entries into the related columnar positions of these relays. Thus, it will be noted that a 1 is entered into column 10 of the C relays during the *a* period of step 8, and this is transferred to the B relays at the next impulse period and then retransferred one unit higher during the *a* period of step 7 and so on to progressively advance the setting of the C relays, so that at the *a* impulse period of the 0 step the divisor and multiplier are set up in the columns noted.

The EA entering relays which receive the dividend factor shift a set of *b* contacts in Fig. 3 (upper left corner) to effect transfer back and forth between the set of A relays and D relays of Fig. 2, in substantially the same manner as explained between the B and C relays to progressively advance the setting on the D relays in accordance with the value of the dividend. Specifically, upon energization of the EA relay, the next following *a* impulse will complete a circuit from the *a* impulse wire, wire 21, *b* contacts of the 1 relay A (normal), *b* contacts of the 4 relay A (normal), the number 1 *b* contacts of relay EA, the 1 wire of the group designated 22 (Fig. 2) to the 1 relay D, which closes its *a* contacts to provide a holding circuit extending through wire 23, to the *d* contacts of relay R5 and to the *b* impulse wire to maintain the D relay energized through the *b* impulse period, during which the retransfer circuit is traceable as follows: from the *a* wire (Fig. 2), *d* contacts of relay R5, wire 23, *b* contacts of relay TC, *c* contacts of the 1 relay D (shifted), the 1 wire of the group 24, number 1 *b* contacts of relay NA (normal), number 1 *b* contacts of the group controlled by relays CS to the 1 wire of the group 25 (Fig. 3), to the 1 relay A and thence to ground. The next *a* impulse will extend to the contacts of this 1 relay A and the *b* contacts numbered 2 of relay EA to energize the 2 relay D, and its contacts in turn will direct the next *b* impulse through the wires 24 and 25 to energize the 2 relay A and so on, to step up the value until the relay EA is deenergized at the 0 step as already explained.

From the foregoing and as graphically indicated in Fig. 5, the factors are entered into the various sets of relays in progressive increments for each of the digits so that at the *a* period of the 0 step they stand with the divided set on the D relay and the divisor and multiplier set in spaced sections of the C relays.

*Multiplier and divisor holding circuits.*—The setting of the C relays is to be maintained throughout subsequent operation of the apparatus, and the holding circuit is accordingly provided which will maintain this last setting. Referring to Fig. 2, relay R11, when energized, closes its *g* contacts so that at the *b* impulse time in step 0 a circuit is completed from the *b* impulse wire, *g* contacts of relay R11, connection 26, to reray R8 and ground. This relay closes its *a* contacts to provide a holding circuit through the *a* contacts of relay CB9 to line 15. Relay R8 opens its *b* contacts which are in the pickup circuit for relay CB9, so that energization of the latter is prevented and the holding circuit for relay R8 will now be maintained for the period indicated in the timing diagram (Figs. 7a, 7b) until relay CB9 is energized through *e* contacts of relay R1, as will be explained later.

The holding circuits for the C relays will accordingly extend through the *a* contacts of relay CB9 to line 15 and, since these *a* contacts now remain in the position shown in Fig. 2, the C relays will maintain their last setting which is representative of the divisor and multiplier until the completion of the computing operations which are now about to commence.

*Step 0(b), inverted transfer from C to B relays.*—As the first step in the operation, which is noted from Fig. 5 (*b* period of step 0), the divisor and multiplier are transferred invertedly or in the form of 9's complements from the C relays to the B relays, concurrently with the transfer of the multiplicand from the D relays to the A relays, all of which takes place during the *b* impulse period of the 0 step. The manner in which the inverted transfer takes place is as follows.

Referring to Fig. 2, the contacts M6 close at the *b* impulse part of the 1 step (See Fig. 7a) and a circuit is completed at that time to energize relay R22. This relay closes its *a* contacts to provide a holding circuit to the *a* impulse wire, which will hold the relay energized through the *a* period of the next following step, which is the *a* period of the 0 step, and at such time a circuit extending from the *b* contacts of relay R22 will energize the inverting relay designated SU which in turn through its a contacts provides a holding circuit through the b impulse wire, so that the relay SU will remain energized through the b impulse period of the 0 step.

Relay SU through its b and c contacts will invert the readout circuits from the contacts of the C relays, so that the 9's complement of the value will be transferred. To illustrate, let it be assumed that in a denominational order of the C relays the digit 1 is set up. Accordingly, at the b impulse time a circuit is traceable from the b impulse wire in Fig. 2, a contacts of relay R12, d contacts of relay HNA, f contacts of relay CAR, c contacts of relay SU (shifted), b contacts of 5 relay C to the 5 wire 20. A parallel circuit extends through the c contacts of relay HNA, e contacts of relay CAR, b contacts of relay SU (shifted), c contacts of 1 relay C (shifted), c contacts of 2 relay C to the 2 wire 20. A third circuit extends from the b impulse wire, through d contacts of relay R5, b contacts of the 1 relay C (shifted) to the 1 wire 20 to thereby energize the 1, 2 and 5 relays B in representation of the 9's complement of 1 which is 8.

Where none of the C relays is energized (representing a 0 entry), the 5 and 4 relays B are energized in accordance with the value 9 and the controlling circuits for this condition are readily identifiable upon inspection without specific tracing thereof. At the b impulse period of the 0 step, we now have the dividend set in the A relays and the other two factors set in the B relays in the denominational positions initially determined by the plug connections 16, 17 and 18 in Fig. 1.

Briefly referring to these connections and also to the flow chart (Fig. 5), the multiplier is entered with its units order in the units or number 10 column of the C relays, the divisor is entered with its units order in the 4 order of the C relays, and the dividend is entered with its units order in the number 7 column of the D delays. With this plugging arrangement, the apparatus will handle all problems where the maximum number of digits is three with the 10 position capacity for the sets of relays shown for purposes of illustration.

*Step 11(a).*—At the next impulse period, specifically the a impulse period of step 11, the machine performs three functions which will be separately explained; first, it will add together the amounts standing in the A and B relays and enter the sum thereof into the D relays. Secondly, and concurrently therewith, it will transfer the dividend value from the A relays to the F relays, and thirdly, it will effect a comparison between the dividend and the divisor by comparing the settings in the four highest positions of the A and B relays.

*Transferring the dividend from the A relays to the F relays.*—Referring to Fig. 3, the A relays are provided with a set of r contacts which are connected to a common wire 27 extending to the a contacts of relay CB12. This relay is normally deenergized. Referring to the timing chart (Fig. 7a), cam contacts M5 which close at the 9 time in the cycle energize a relay R7 to close its b contacts and thereby provide a holding circuit through the a contacts of relay CB12 to line 15, so that relay R7 remains energized for the period indicated, that is, up to the end of the 0 step, and by opening its c contacts will prevent the transmission of an energizing impulse to relay CB12. When R11 is energized, as already explained, it closes a pair of f contacts through which, at b impulse time, a circuit is completed from the b impulse wire to relay R9, which closes its a contacts to provide a holding circuit through the following a impulse period. It also closes a pair of b contacts to complete a circuit from line 15, through the master contacts M4a, b contacts of relay R9 and relay CB12. Relay CB12 shifts its a contacts to break the holding circuit for relay R7. From this point on, relay CB12 will be energized repeatedly through a circuit from line 15, contacts M4a, c contacts of relay R7, a contacts of relay R6 to relay CB12, so that the a contacts of relay CB12 will shift during the a period of succeeding steps, until the a contacts of relay R6 are opened.

Upon first shifting of contacts of relay CB12, such as at the a impulse period of step 11, current is transmitted from line 15, through the a contacts of relay CB12 (shifted), thence in parallel through the r contacts of the A relays, through a contacts of relay CF to a group of wires designated 28 (Fig. 2) which extend to the corresponding F relays, to transfer the setting on the A relays representative of the dividend to the F relays, which close their a contacts to hold the circuits through a pair of b contacts of relay CB12, which latter contacts will close before their related a contacts open, so that there is an overlap enabling the F relays to be set up and held before the controlling CB12 contacts open.

*Summation circuits*

Referring to Fig. 3, the B relays are provided with a set of contacts which are interconnected with additional contacts of the A relays. These contacts are identified as "summation circuits" in Fig. 3 and may be described as being interconnected in accordance with the table of addition. The operation may be best explained by assuming a specific setting in the A and B relays in the one denominational order and tracing the circuits involved.

Assuming the A relays set to represent the digit 7 and the B relays set to represent the digit 5 (complement 4), a circuit will be completed to transfer the units digit of their sum in response to an a impulse at step 11 through a circuit traceable from the a impulse wire, c contacts of relay CF, b contacts of relay EB, to wire 29, thence up through the summation circuits to the path emphasized by a heavy line traceable through the d contacts of the 4 relay B, e contacts of the 2 relay B, f contacts of the 1 relay B, h contacts of the 1 relay A, f contacts of the 2 relay A (shifted), e contacts of the 4 relay A, 2 wire of the group designated 30, b contacts of relay EA, to the 2 wire of the group 22 (Fig. 2), and thence to the 2 relay D which closes its a contacts to hold the setting through the b impulse period of step 11.

When the sum of the two digits is 10 or more, a tens carry circuit is completed to energize the relay TC related to the set of D relays in the next higher order. For this purpose, the A and B relays are provided with additional contacts s and t (shown at the lower right corner of Fig. 3) and interconnected as shown so that, whenever the sum of two digits exceeds 9, a circuit will extend through these contacts to a wire 31. To illustrate this carry operation, assume the foregoing problem of 7+5 (complement 4), in which case the s and t contacts of the 2 relay A are shifted, the s contacts of the 5 relay A and the s and t contacts of the 5 relay B.

At the *a* impulse time of step 11, the circuit is completed from the *a* impulse wire, through wire 21 extending up to the *c* contacts of relay EA, wire 32, thence through the *s* contacts of the 5 relay B (shifted) and the 5 relay A (shifted) in series to wire 31. Referring now to Fig. 1*a* and assuming that the two digits added were set up in the units or column 10 order of the apparatus, the wire 31 extending from this units order extends through the *a* contacts of relay S10 to wire 33 of the next order which (referring back to Fig. 3) branches to wires 34 and 35 in such next higher order. The wire 35 extends to Fig. 2 where it completes the circuit to the carry relay TC and ground. This relay closes a pair of *a* contacts to hold the relay along with whatever D relays may have been energized in response to concurrent *a* impulses. The effect of energizing the relay TC is to add a 1 to the setting and, as will be pointed out subsequently, when the amount set on the D relay is read out, it will be read out with a value one unit higher. If in this next higher or tens order the setting on the A and B relays aggregates 9, a so-called carry-on-carry circuit will be completed from the wire 34 (Fig. 3) down through the *s* and *t* contacts of the A and B relays to wire 31 extending from that order (Fig. 1*a*) and through the *a* contacts of relay S9 to the wire 33, extending into the next or hundreds order and so on.

*Column splits.*—Referring to Fig. 1*a*, the relay R11 is provided with a pair of *a* contacts which are initially plug connected to the 8 socket 37 for the problem chosen. The socket to which connection 36 is made from the *a* contacts of relay R11 is determined by the maximum size of the multiplier which, in this case, is of three positions, and the purpose thereof is to segregate the first three orders, that is, the units, tens, and hundreds orders of the summation network, so that tens carries will not be effected into the thousands order.

Upon energization of relay R11, as indicated in the time chart and as previously explained, a circuit is traceable in Fig. 1*a* from the *b* impulse wire at the *b* impulse time of the 0 step, through wire 38, *a* contacts of relay R11, connection 36, 8 socket 37, relay S8 to ground. This relay closes its *d* contacts to provide a holding circuit through the *a* impulse wire to hold the relay S8 through the next following impulse period. When relay R11 is deenergized at the end of the 0 step, relay S8 will remain energized through a further holding circuit traceable from ground, through relay S8, its *c* contacts (now shifted), and thence serially through the *c* contacts of relays S7, S6, etc. and the *c* contacts of relay S2, to the 1 plug socket 37 from which a plug connection 39 extends to Fig. 1*b* and socket 40, wire 41, through the *b* contacts of relay R18 (now shifted as will presently be explained), *c* contacts of relay R5, to the *b* impulse wire.

Figure 1B:
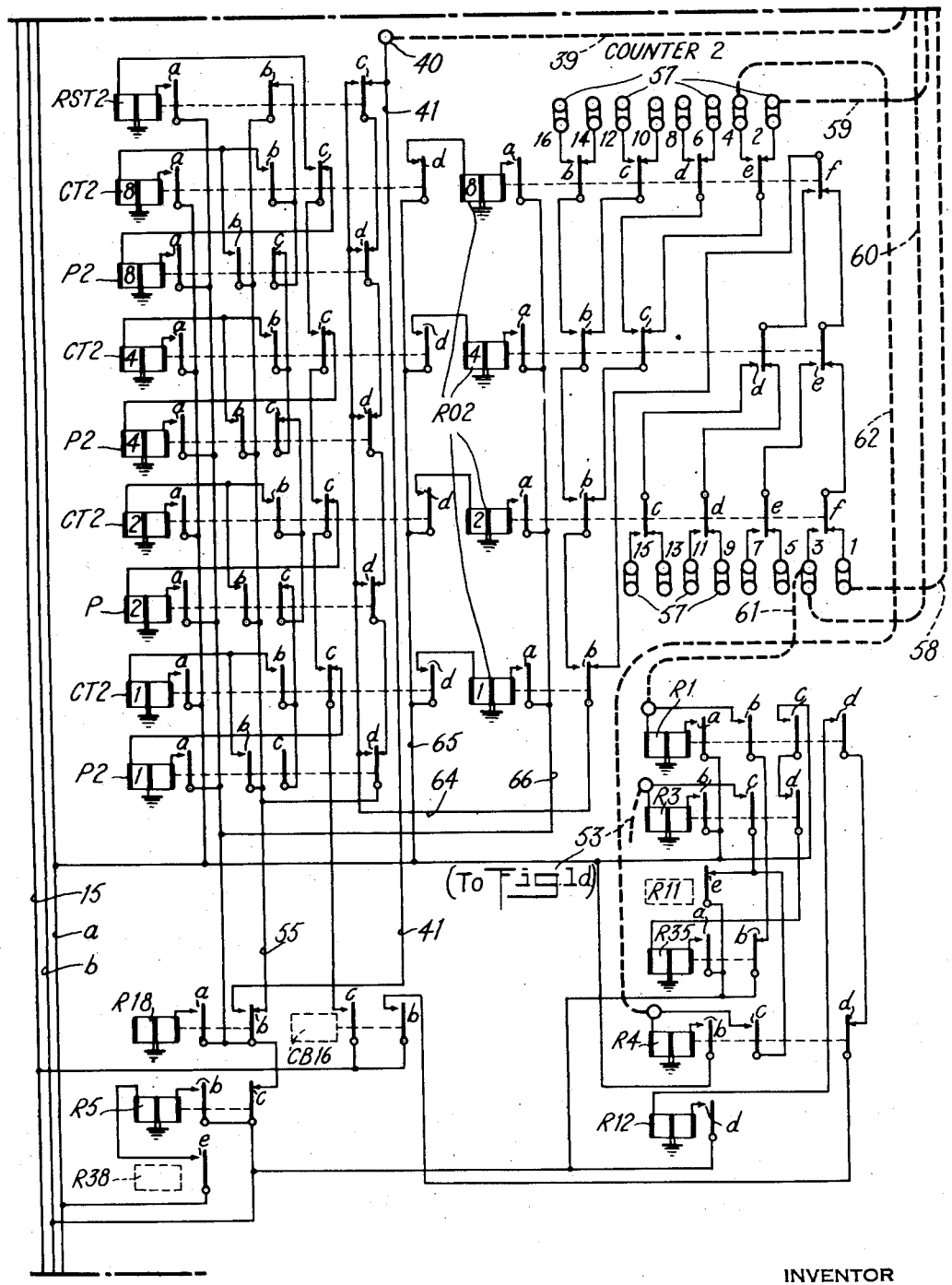

This circuit is completed at the *b* time of step 11 and just prior thereto at the *a* time relay R18 is energized through a circuit traceable in Fig. 1*c*. This relay R18 is energized in response to the operation of the comparing unit and the specific tracing thereof will be deferred until the comparing circuits have been explained. Suffice it to say at the present time that, as a result of comparison, which is taking place at the same moment, an impulse is transmitted in accordance with the prevailing conditions to energize relay R18, so that its contacts in Fig. 1*b* are in shifted position to enable completion of the second holding circuit for the relay S8, so that its *a* contacts are in shifted position during the *a* period of step 11, so that no tens carry will take place from the hundreds to the thousands order (for the present example there would be no tens carry in any event).

*Comparing circuits*

Figure 4:
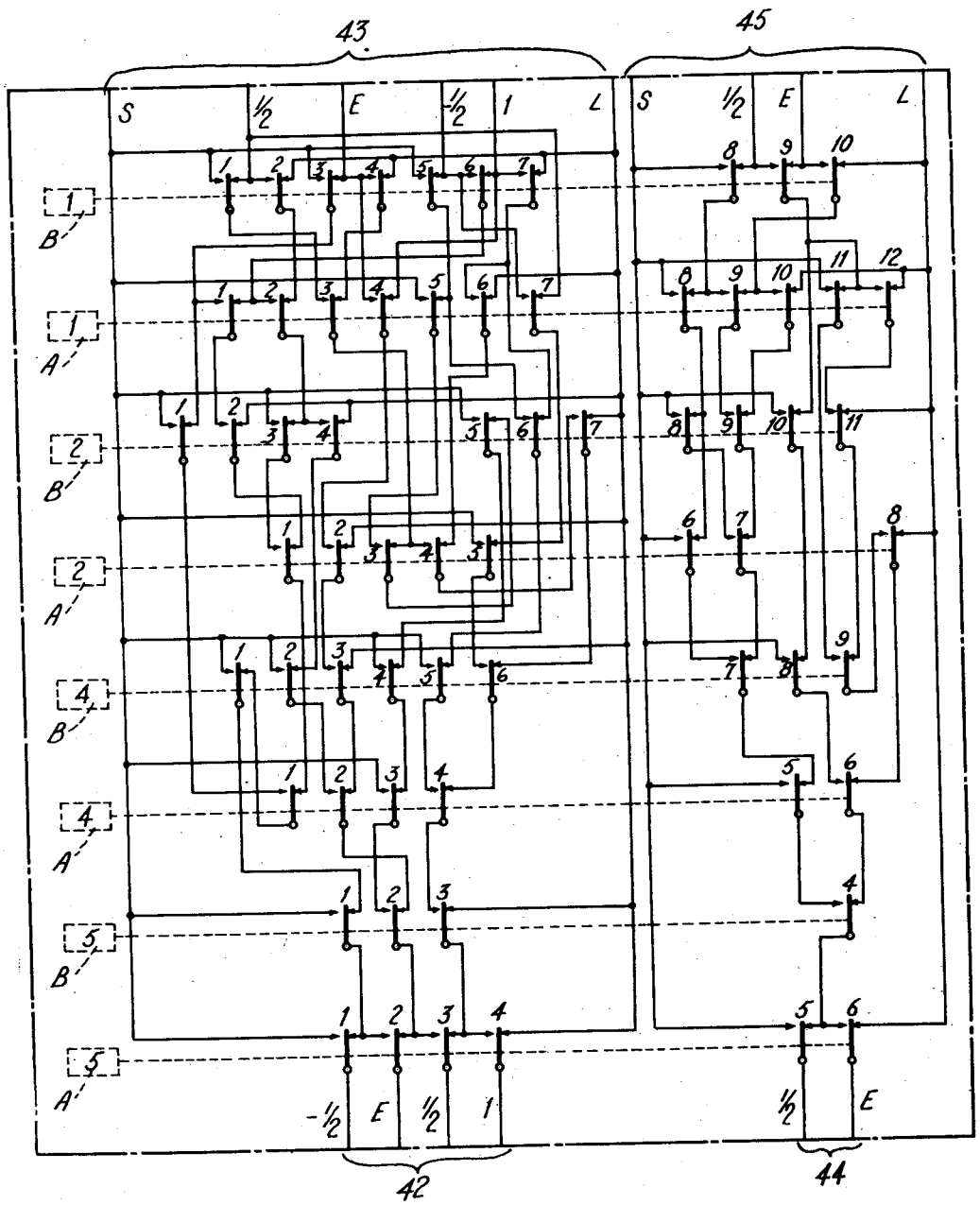

Referring to Fig. 1*c*, rectangles containing the designation Fig. 4 each contain a circuit network as shown in Fig. 4, on which the values standing in the four highest positions of the A and B relays are set up. At the *a* impulse time of step 11, an impulse will be transmitted through this network extending serially from the highest through the lowest order to selectively energize relays designated CS and NA. When relay CS is energized, it calls for a column shifting operation and, when relay NA is energized, it prevents the transfer from the D relays to the A relays and effects connection between the contacts of the F relays to the A relays, as will be specifically explained hereinafter.

Referring to Fig. 4, each of the A and B relays is provided with a plurality of numerically identified contacts which are interconnected as shown and formed into a left hand network and a right hand network. The left hand network has four input wires 42 and six output wires 43. In the right hand section there are two input wires 44 and four output wires 45. The input and output wires between the several orders are connected as shown in Fig. 1*c* through contacts of relays S2, S3 and S4, which contacts are normally in the positions shown. In the highest order or column 1 position, the two central input wires 42 are connected to the *a* contacts of relay R33 and the 2 wires 44 are connected to *b* contacts of the same relay.

It may be generally stated that, whenever the value set on the B relays is in the form of a complement, relay R33 and also R34 of Fig. 1*c* are energized prior to sending a comparison impulse to the comparing network and conversely, whenever the value set up in the B relays is in the form of a true number, these relays are not energized. In accordance with the present example and as noted in Fig. 5, the B relays contain the complement of the divisor and multiplier at this time. As noted from the timing diagram, relay SU is in energized condition at the *b* period of the 0 step, so that at such time its *b* contacts (Fig. 1*e*) are shifted and a circuit is traceable from the *b* impulse wire, through *b* contacts of relay R12, *c* contacts of relay HNA, *d* contacts of relay CAR, *b* contacts of relay SU (shifted) to relays R33 and R34, which will close their *c* and *d* contacts, respectively, to establish a holding circuit through the *a* impulse wire, which of course will make the holding circuit before the pickup circuit is broken.

Therefore, at the *a* time of step 11 when the comparing impulse is transmitted, these two relays will be in energized condition. This comparing impulse extends from line 15 (Fig. 1*c*), contacts M4*d*, *a* contacts (normal) of relays R7, R3 and R4, *a* contacts of relay R33 (shifted) to the third wire 42 from the left designated ½ (Fig. 4). For the problem under consideration and assuming Fig. 4 represents the comparing network in the highest order, the dividend digit set in this order is 0 and the divider digit of 0 is set as the complement 9. Thus, the 4 and 5 B relays will be in energized condition and the circuit entering the ½ wire 42 will continue through the 3 contacts of the 5 relay A, 3 contacts of the 5 relay B (shifted), 4 contacts of the 4 relay A, 6 contacts of the 4 relay B (shifted), 5 contacts of the 2 relay A, 7 contacts of the 1 relay A, to the ½ wire 43 (Fig. 1c), wherein this wire extends to the e contacts of relay S2 to the ½ wire 42 entering the comparing network in the next order in which the dividend digit is 0 and the divisor digit 7 set up as the complement 2 therein.

Accordingly, and assuming the network in Fig. 4 represents the next order, the 2 relay B is energized so that the circuit entering through the ½ wire 42 extends through the 3 contacts of the 5 relay A, the 3 contacts of 5 relay B, to the right hand wire 43 which is designated L (see Fig. 1c). This wire is connected to a wire designated 47L and continues the circuit through the a contacts of relay R34 (shifted) to relay CB16 and ground. Relay CB16 closes its k contacts to energize relay R20 and the column shift relay CS which closes their d and a contacts respectively to provide holding circuits through the b impulse wire, which will hold the relays R20 and CS energized through the following b impulse period of step 11.

It may be stated at this point that the extension of the circuit through wire 47L signifies that the true dividend value is less than 1½ times the true value of the divisor. In a subsequent chapter entitled "Principles of Operation of the Comparing Unit," the theory underlying the comparing network will be more fully explained.

Concurrently with the circuit extending through the relay CB16; a parallel circuit extends from the shifted b contacts of relay R33 (Fig. 1c), through the left hand wire 44 designated ½ (Fig. 4), through the 5 contacts of 5 relay A, 4 contacts of the 5 relay B (shifted), the 5 contacts of the 4 relay A, the 7 contacts of the 4 relay B (shifted), the 6 contacts of the 2 relay A, the 8 contacts of the 1 relay A, the 8 contacts of the 1 relay B, the second wire from the left of the group designated 45, which is separately designated ½, and in Fig. 1c extends through the i contacts of relay S2 to the ½ wire 44 in the next higher order.

Continuing the circuit through this higher order on the circuit of Fig. 4, it continues through the 5 contacts of 5 relay A, 4 contacts of the 5 relay B, the 6 contacts of the 4 relay A, the 8 contacts of the 2 relay A, to the right hand or L wire 45 (Fig. 1c) to a wire 48L and thence through c contacts of relay R34 (shifted) to energize relay CB15. This relay closes its k contacts to energize relay NA which closes its a contacts to hold in parallel with the relay CS through the b impulse wire.

Completion of a comparing circuit through the wire 48L is an indication that the true dividend value is less than ½ the true value of the divisor as represented on the denominational orders being compared.

*Step 11 (b)*.—Accordingly, the relays CS and NA are in energized condition during the b impulse period of step 11, so that their contacts in the upper left part of Fig. 2 will be in shifted position, and during this period as indicated on the chart (Fig. 5) the dividend value 518 set up in the F relays will be transferred to the A relays with a column shift of one place to the left, and concurrently the divisor and multiplier will be again transferred from the C relays to the B relays in the form of complements.

Tracing the circuits for the dividend transferred on Fig. 2, they extend from the b impulse wire, d contacts of relay R5, wire 23, thence in parallel through the b contacts of the F relays in accordance with the digital values set thereon to the b contacts of relay NA (now shifted), the b contacts of relay CS (now shifted) to a group of wires designated 50 which in Fig. 1a extend out of each higher denomination to the next lower denomination (see Fig. 3), where they connect with wires 25 to energize the A relays of the lower order.

*Complementary transfer of divisor and multiplier*.—Referring to Fig. 1c, a relay HNA is energized in parallel with the relay NA through a branch circuit extending through d contacts of column 1 relay CF to energize relay HNA which closes its f contacts to hold through the b impulse wire. At the b impulse time of step 11, the transfer circuit is traceable in Fig. 2 from the b impulse wire, a contacts of relay R12, c and d contacts of relay HNA (shifted), thence upward through the contacts of the R27, CAR, SU relays, thence through the contacts of the C relays to the wires 20 representing the 9's complement of the digit standing on the C relays, and through these wires over to Fig. 3 where they energize the B relays. Specifically, circuits through the c contacts are similar to those explained in connection with the complement transferred during the b impulse period of the 0 step.

*Principle of operation of the comparing unit*

½ *comparison circuits*.—The purpose of these circuits, one order of which is shown at the right of Fig. 4, is to compare the dividend and divisor to ascertain whether the dividend is equal to, less than or greater than ½ the divisor. If the dividend is less than ½ the divisor, relay NA is energized, and for the other two conditions the relay is not energized.

The correspondingly ordered digits of the two factors are simultaneously compared through a test circuit extending through contacts set up in representation of the digits, beginning with the highest order. In following such procedure, if the highest dividend digit is greater than ½ the divisor by .5 or more, further testing is unnecessary as such order establishes the condition of $Dd > \frac{1}{2} Dr$. If the highest order of the dividend is equal to ½ the corresponding divisor digit, the comparison continues to the next lower order digits and so on. If the highest dividend digit is less than ½ the divisor digit by just .5, it is necessary to consider the next lower order as this .5 remainder may have an effect on the ultimate comparison. If the dividend digit is less than the divisor digit by more than .5, further testing is unnecessary as such order establishes the condition of $Dd < \frac{1}{2} Dr$.

To illustrate these conditions, consider the factors

Dividend    4   3   4   7
Divisor       8   6   9   2

In this example, consideration of the first order indicates $Dd = \frac{1}{2} Dr$; consideration of the second order (plus the first) indicates $Dd = \frac{1}{2} Dr$; consideration of the third order (plus the first and second) indicates $Dd < \frac{1}{2} Dr$ by .5. The comparison made between the 7 and 2 in the fourth order is made as though the values were 7 and 12, resulting in the condition $Dd > \frac{1}{2} Dr$ and non-energization of relay NA. Any further orders would have no effect.

Now consider:

Dividend    4   3   4   5
Divisor       8   6   9   2

In this example, the first three orders compare as before with the last order comparing 5 with 12, resulting in the condition $Dd<\frac{1}{2}Dr$ and relay NA is therefore energized.

In Fig. 4, the contacts connected between wires 44 and 45 are settable to represent a dividend digit (in true form) and a divisor digit (in complementary form) during certain steps of operation, such as steps 11, 12, 13 (see Fig. 5). At other steps, such as steps 14, 15, 16, the dividend may be set up as a complement, with the divisor in true form.

Figure 8:
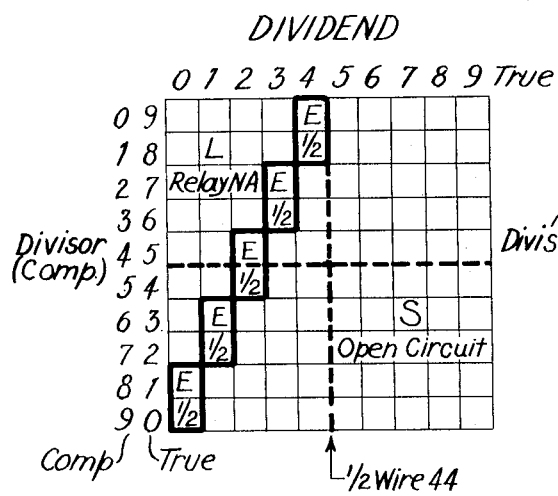
Figure 9:
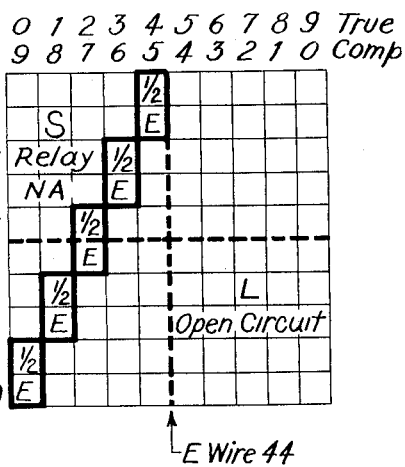
Figure 8A:
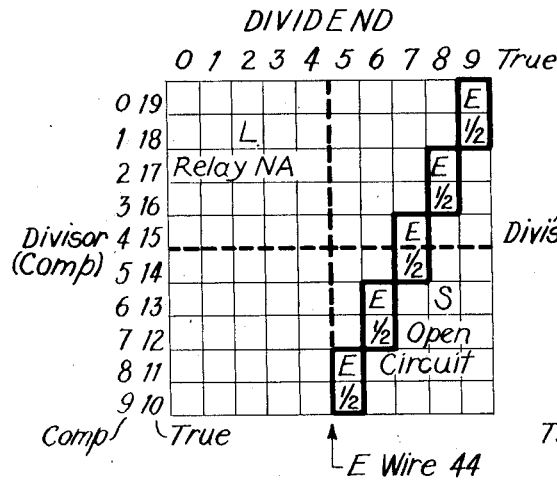
Figure 9A:
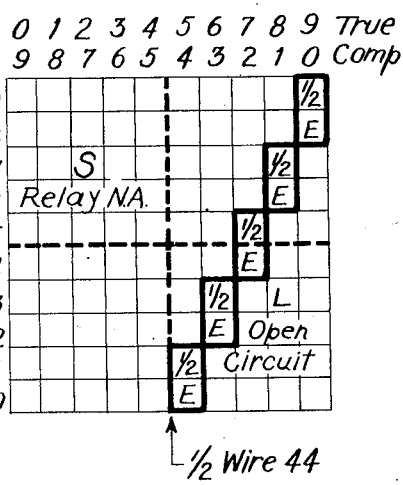

In order to facilitate the circuit tracing for different digit combinations that may be set up, Figs. 8 and 8a represent graphically the conditions for a complementary divisor setting and a true dividend setting, in which case as already explained relays R33 and R34 are in energized condition to direct the comparison impulse to the ½ wire 44 entering the highest order. Relay CB15 through which relay NA is energized is connected through wire 48L to all the wires 45 designated L.

Accordingly, in Fig. 8 if the intersection of the dividend ordinate and the divisor ordinate (true value) lies in the L field, relay NA is energized. If it lies in the S section, the circuit is interrupted. If it lies in a ½ rectangle, the circuit continues through the ½ wire 45 to the ½ wire 44 in the next order, and so on. If it lies in an E rectangle, the circuit continues through the E wire 45 to the E wire 44 of the next section, and in such next section the comparison is in accordance with the graphic representation of Fig. 8a.

Here the divisor digits are represented as increased by the carry from the higher order. Thus, the point of intersection will fall in an S or L section or an E or ½ rectangle according to the digits set up.

When the dividend is set up as a complement, relays R33, R34 are not energized so that relay CB15 is connected through wire 48S (Fig. 1c) to all the S wires 45. Also, the comparison impulse is directed to the E wire 44 entering the highest order. This effects a reversal of conditions as graphically shown in Figs. 9 and 9a, so that where a dividend digit is greater than ½ the divisor digit and falls in the L section, relay NA is not energized.

Where the intersection is in the S section, the circuit is completed to energize relay NA. Where the intersection is in an E rectangle, the circuit extends through the E wire 45 to the E wire 44 in the next order. Where the intersection is in a ½ rectangle (denoting $D'd<\frac{1}{2}D'r$ by .5), the circuit extends through the ½ wire 45 to the ½ wire 44 in the next order where comparison is as set forth in Fig. 9a. Here, as for Fig. 8a, comparison is between the dividend digit and the divisor digit plus 10, to energize relay NA if the intersection occurs in the S section.

With the diagrams of Figs. 8, 8a, 9 and 9a, any pair of factors set up on the ½ comparison circuits can be traced from order to order under the alternate complement setting conditions, and it will be noted that wherever the dividend is less than ½ the divisor within the four position range provided for, relay NA will become energized by the appropriate a impulse.

*1½ comparison circuits.*—The purpose of these circuits, one order of which is shown at the left of Fig. 4, is to compare the dividend and divisor to ascertain whether the dividend is equal to, less than or greater than 1½ times the divisor.

If the dividend is less than 1½ times the divisor, relay CS (Fig. 1c) is energized, and for the other two conditions it is not energized.

The values are compared digit by digit from left or highest order to right or lower orders as for the ½ comparison. As the values are compared order by order, the testing impulse continues to the next order if the dividend digit is greater than 1½ the divisor digit by only 1 or .5, since the following digit may change the condition making the dividend smaller than 1½ the divisor. In cases where the dividend is smaller than 1½ the divisor by only .5, the impulse also passes to the following digit which may make the dividend larger than 1½ the divisor.

If the $D'd<1\frac{1}{2}D'r$ by more than 1 or if $D'd<1\frac{1}{2}D'r$ by more than .5, the comparison does not continue but indicates that the dividend as a whole is larger or smaller, since lower order digits cannot alter the relation. Figs. 10, 10a, 10b and 10c show graphically the digit relationship for true dividends and complementary divisors, under which conditions the test impulse enters through the highest order ½ wire 42 and relays R33 and R34 are in energized condition.

Figure 10:
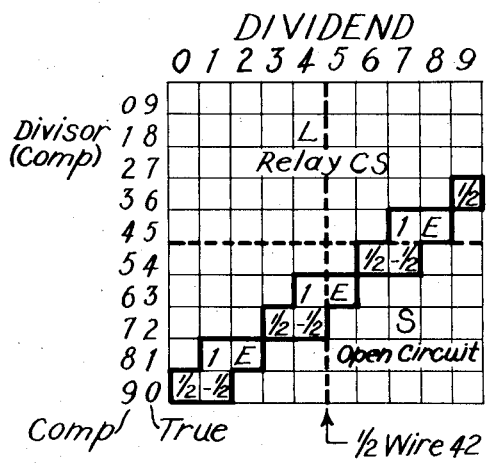

Consider, for example, a dividend of 55084 and a divisor of 36725 with the latter set up in the form of a complement on the relays of Fig. 4. The test impulse entering through the ½ wire 42 will compare the dividend 5 and divisor 3 in this order. In Fig. 10 the ordinates intersect in an E rectangle and in Fig. 4 the impulse extends to the E wire 43 to enter the E wire 42 in the next order where the digits 5 and 6 are set up.

Figure 10A:
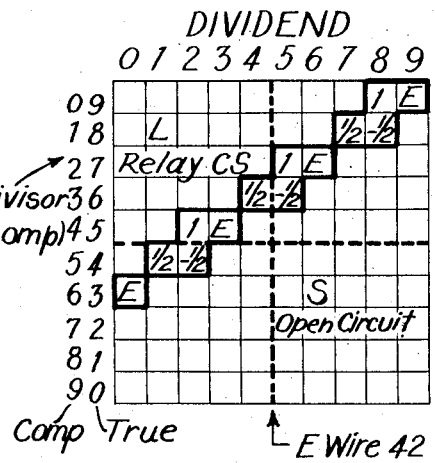

In Fig. 10a, the ordinates for 5 and 6 intersect in the −½ rectangle and in Fig. 4 the circuit extends to the −½ wire 43 to continue to the −½ wire 42 in the next order where 0 and 7 digits are set up.

Figure 10B:
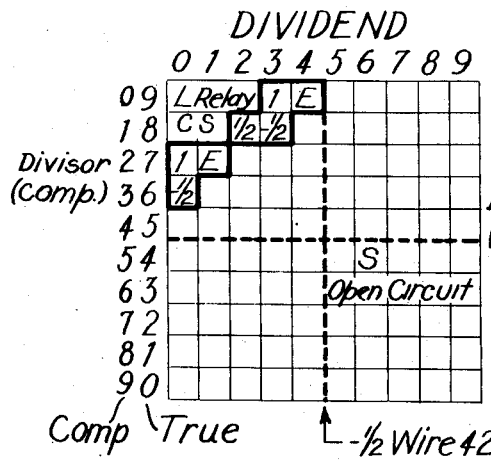

In Fig. 10b, the ordinates for 0 and 7 intersect in the 1 rectangle and in Fig. 4 the circuit extends to the 1 wire 43 to continue to the 1 wire in the next order where 8 and 2 are set up.

Figure 10C:
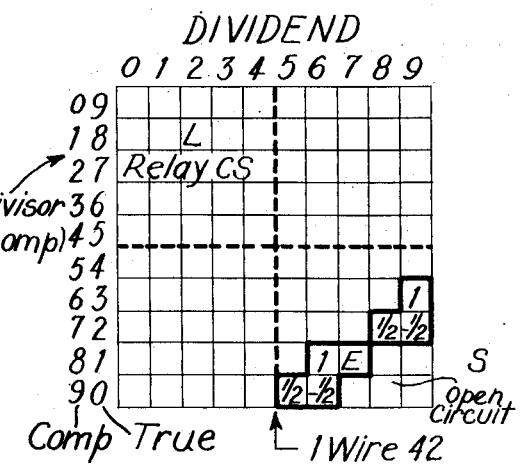

In Fig. 10c the ordinates for 8 and 2 intersect in the ½ rectangle and in Fig. 4 the circuit extends to the ½ wire 43 in the next order, where the digits 4 and 5 are set up.

In Fig. 10, the ordinates for 4 and 5 intersect in the L section and in Fig. 4 the circuit extends to the L wire 43 which, through wire 42b (Fig. 1c) causes energization of relay CS.

The following chart summarizes the foregoing statements:

| Wire 42 | Dividend | Divisor | Wire 43 |
|---|---|---|---|
| ½ | 5>1½ times | 3 by 0.5 | E |
| E | 55>1½ times | 36 by 1.0 | −½ |
| −½ | 550<1½ times | 367 by 0.5 | 1 |
| 1 | 5508=1½ times | 3672 | ½ |
| ½ | 55084<1½ times | 36725 by 0.5+ | L(CS) |

Where the comparison extends to the lowest order and in such order the circuit continues to its 1 wire 43 (denoting that $Dd<1\frac{1}{2}$ times $D'r$ by 1), such circuit (Fig. 1c) will continue through wire 247L, b contacts of relay R34 (shifted) to energize relays CB16 and CS.

Considering now the same example with the dividend 55084 set up as a complement and the dividend 36725 set up in true form, the relays R33 and R34 are deenergized and the circuit enters the highest comparing order through the E wire 42 and circuits similar to those explained will be traceable and can be summarized as in the following chart.

| Wire 42 | Dividend | Divisor | Wire 43 |
|---------|----------|---------|---------|
| E | 5>1½ times | 3 by 0.5 | ½ |
| ½ | 55>1½ times | 36 by 1.0 | 1 |
| 1 | 550<1½ times | 367 by 0.5 | −½ |
| −½ | 5508=1½ times | 3672 | E |
| E | 55084<1½ times | 36725 by 0.5+ | S(CS) |

Inspection of this chart and the previous one shows that wires E and ½ are transposed; wires 1 and −½ are transposed, and wires S and L are transposed. From this it follows that the charts of Figs. 10, 10a, 10b and 10c will apply for this condition if the transposition of designations is made as stated.

Counter circuits

Figure 1D:
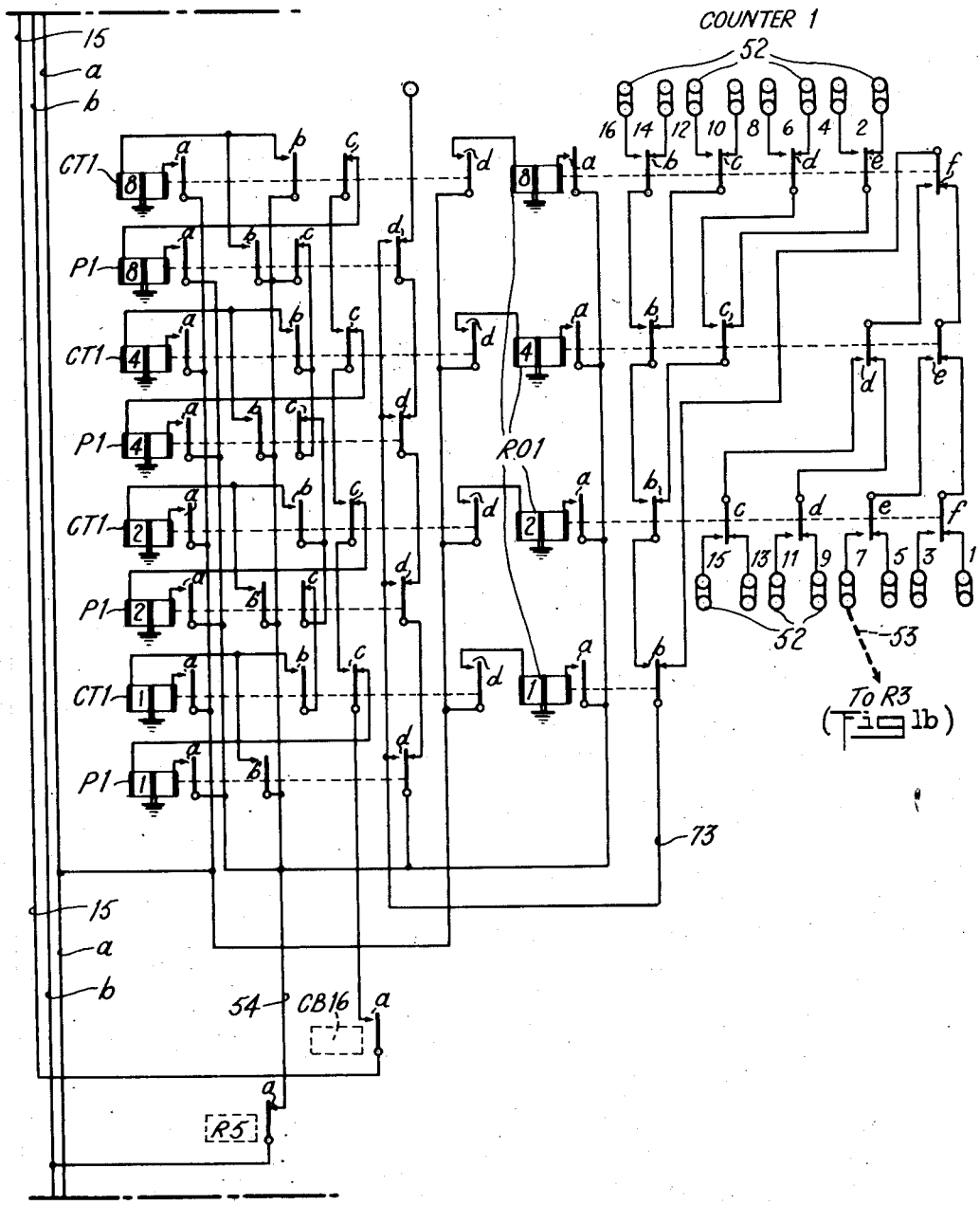

Referring to Fig. 1c, relay CB16 as explained is energized when a column shift is called for and its contacts k close the circuit to the column shift relay CS, so that it will be energized. In Fig. 1d is shown a relay counter represented by relays generally designated CT having the binary values 1, 2, 4 and 8, and it is the function of this counter to count the number of column shift operations and to terminate calculating or computing after a predetermined number of shifts has taken place. Associated with the counter are a plurality of numbered plug sockets designated 52 from a selected one of which a plug connection 53 is made to relay R3 in Fig. 1b. The particular socket 52 to which the connection is made is determined by the number of digits in the highest possible divisor and the number of quotient digits to which the dividing part of the problem is in effect carried out. In the present case, the maximum number of divisor digits for the capacity illustrated is 3, the desired quotient extension is 3, thus making a total of 6 to which 1 is added to obtain 7, thereby determining that the connection 53 is to be made to the 7 socket 52.

When the relay CB16 is energized, as explained, it closes its a contacts (Fig. 1d) completing a circuit from line 15, through the a contacts of relay CB16, c contacts of relay CT1, and a pilot relay P1 designated 1. It will be recalled that relay CB16 was energized in response to an impulse at the a period of the 11 step. At the following b impulse period, a holding circuit is set up from the 1 relay P1, through its a contacts, wire 54, a contacts of relay R5, to the b impulse wire to hold the relay P1 energized through the b period of step 11.

This b impulse simultaneously completes a circuit through the b contacts of relay P1 to the 1 relay CT1 which in turn, through its a contacts, will hold through the next following a impulse to the a wire. This holding circuit will maintain the 1 relay CT1 energized through the a period of step 12, and it will close its b contacts to provide a further holding circuit from the relay through the b contacts and thence upward through the c contacts of the 2, 4 and 8 relays P1 to wire 54 and the b impulse wire.

If no further column shift impulse occurs for a number of steps of operation, the relay CT1 will remain energized through the alternate holding circuits. Inasmuch as the contacts of relay CB6 (Fig. 1) controlling the a and b impulses are of the make-before-break type as previously stated, the one circuit will make before the other breaks, so that there would be in effect a continuous holding of the CT1 relay.

Referring to Fig. 1b, a second counter is provided with pilot relays P2 corresponding to the P1 relays of Fig. 1d and the counting relays CT2 corresponding to the relays CT1 of Fig. 1d. In Fig. 1b, relay magnet CB16 closes a pair of c contacts, which will energize the 1 relay P2. In this case the incidental closure of the b contacts of relay P2 will not energize the companion relay CT2, since the pickup circuit extending through wire 55 is open at the now shifted b contacts of relay R18. This opening is brought about as follows.

Referring to Fig. 1c, relay R18 is energized in parallel with the relay NA through a circuit branching from the k contacts of relay CB15 to wire 56, c contacts of relay R21 to relay R18. This circuit is completed at the a period of step 11 (see Fig. 7a). Relay R18 in Fig. 1b closes its a contacts to provide a holding circuit through its a contacts, c contacts of relay R5, to the b impulse wire, so that the relay is held during the following b impulse period and its b contacts are accordingly shifted, so that the circuit to the CT2 relay is not completed.

It may be briefly stated at this point that the function of this second counter is to count the quotient digits and control other machine functions, such as column split operations at appropriate times. This counter has associated therewith 16 sockets designated 57, to which plug connections are made as shown. The 1 plug socket is connected through connection 58 to the plug socket 37 (Fig. 1a) in the next higher order position to that in which the connection 36 is made. The second and third sockets 57 are then connected in order to the next higher sockets 37, through connections 59 and 60. The number of such successive connections is determined by the number of quotient places desired. The last or 3 socket, which has been utilized, is connected further through the connection 61 to relay R1 and the next following socket 57 designated 4 is connected through a plug connection 62 to relay R4. The manner in which circuits are directed through these connections will be specifically traced at the point of the operation where they occur.

Referring to Fig. 1c, relay R19 is energized through a circuit parallel to the one energizing relay R18 and extending through the b contacts of relay R21 and closes its c contacts to provide a holding circuit through b impulse wire. Relay R20 in the lower left part of the figure is wired for energization in parallel with relay CS, and it closes its d contacts to also provide a holding circuit to the b impulse wire. The point at which relays R19 and R20 are energized is shown in the timing diagram of Fig. 7a, and the circuits controlled thereby will be explained at the time of their occurrence in the sequence of operation.

*Step 12.*—At the a impulse period of this step, the dividend is set on the A relays, the divisor and multiplier complements are set on the B relays, and the machine is about to effect a cross-adding operation into the D relays and at the same time effect a comparison between the four highest positions of the A and B relays. As indicated in the chart of Fig. 5, the cross adding results in the entry of the value 9212179580 into the D relays, and this is effected through circuits similar to those already traced for the summation during the step 11.

At the same time, the dividend is transferred to the F relays through circuits already traced. The comparison circuit will result in completion of exactly the same circuits as explained for step 11, so that there is a repetition of operations resulting in transfer of the dividend from the F relays to the A relays with a column shift toward the left and another inverted transfer of the dividend and multiplier from the C relays to the B relays, so that a third comparison and summation will take place during the *a* period of step 13 to transfer the dividend to the F relays, the sum of the values in the A and B relays to the D relays. Again for the third time the comparison unit finds the same conditions in the two highest orders which are controlling and calls for a column shift operation, so that during the *b* period of step 13 entries are made as diagrammatically represented in Fig. 5, where it is to be noted that the dividend is entered in the A relays with an additional column shift toward the left, and the machine is in readiness for a fourth comparison during the *a* period of step 14.

As explained, the relay CB16 (Fig. 1c) is energized under control of the comparing unit during the *a* impulse period of step 11. It will be similarly energized during steps 12 and 13 and, when energized in step 12, it will close its *a* contacts in Fig. 1d to complete a circuit to the 2 relay P1 through the shifted *c* contacts of relay CT1 and the *c* contacts of the 2 relay CT1. This 2 relay P1 will hold through its *a* contacts and its *b* contacts will effect energization of the 2 relay CT1. This in turn will pick up its dual holding circuits through its *a* and *b* contacts. The 2 relay P1 will open its *c* contacts in the holding circuit of the 1 relay CT1. The impulse through the *a* contacts of relay CB16 in step 13 will again energize the 1 relay P1 as before, and its *b* contacts will energize 1 relay CT1 again, so that the 1 relay CT1 will now hold together with the 2 relay CT1 (see Fig. 7a) to represent a count of 3 in accordance with the binary system of notation.

*Step 14.*—At the *a* impulse period of this step, the dividend is again transferred from the A relays to the F relays as indicated in Fig. 5, and concurrently the sum of the values in the A and B relays will be entered into the D relays as the complement value 9724999580. The comparison unit now finds the value 9206 representing the complement of the divisor 793 set in the four highest orders of the B relays and the dividend value 519 set in the corresponding orders of the A relays. The effect of the relative setting may best be explained by tracing the circuits involved through the several orders.

Referring to Fig. 1c and Fig. 4 to be taken in connection therewith, the highest or column 1 order has its A relays set to represent 0 and the B relays set to represent the 0 complement 9. Relays R33 and R34 are energized as previously explained, so that a circuit is traceable from line 15 (Fig. 1c), contacts M4d, *a* contacts of relays R7, R3 and R4, *a* contacts of relay R33 (shifted) to the ½ wire 42 (Fig. 4), the 3 contacts of the 5 relay A, the 3 contacts of the 5 relay B (shifted), 4 contacts of the 4 relay A, 6 contacts of the 4 relay B (shifted), 5 contacts of the 2 relay A, 7 contacts of the 1 relay A to the ½ wire 43 (Fig. 1c), where it extends through the *e* contacts of the relay S2 to the ½ wire 42 into the next order (Fig. 4). In this next order, the A relays are set to represent the value 5 and the B relays are set to represent the value 2 (complement of 7).

Accordingly, the circuit extends from the ½ wire 42, 3 contacts of the 5 relay A (shifted), 2 contacts of the 5 relay B, 2 contacts of the 4 relay A, 3 contacts of the 4 relay B, the L wire 43 (Fig. 1c), where it extends from the column 2 unit to wire 47L and thence through the shifted *a* contacts of relay R34 to relay CB16, which in turn energizes relay CS.

The result of this comparison indicates that the dividend is less than 1½ times the divisor and calls for a column shift on the following operation. Concurrently, the impulse through the shifted *b* contacts of relay R33 (Fig. 1c) attempts to complete a circuit through the right hand section of the comparison units, and such circuit is partially completed as follows: from the ½ wire 44 (Fig. 4), entering column 1, through the 5 contacts of the 5 relay A, 4 contacts of the 5 relay B (shifted), 5 contacts of the 4 relay A, 7 contacts of the 4 relay B (shifted), 6 contacts of the 2 relay A, 8 contacts of the 1 relay A, 8 contacts of the 1 relay B, to the ½ wire 45, which in Fig. 1c extends to the *i* contacts of relay S2 to the ½ wire 44 in column 2, which in Fig. 4 extends to the contacts of the 5 relay A (shifted) to the S wire 45 which in Fig. 1c extends from the column 2 section to the wire 48S which extends to the now shifted *c* contacts of relay R34, so that the circuit does not extend beyond this point and relay NA is not energized.

Accordingly, at the *a* impulse period of step 14 and in response to the determination that the dividend is less than 1½ times the divisor but greater than ½ the divisor, relay CS is energized without accompanying energization of relay NA, to thereby condition their *b* contacts in the upper part of Fig. 2, so that in response to an impulse received during the *b* period of step 14, the transfer of the dividend from the F relays will now be prevented and instead, the amount standing in the D relays will be transferred to the A relays with a column shift one place to the left as graphically indicated in Fig. 5.

The transfer circuits are traceable generally from the wire 23 of Fig. 2, through the *b*, *c* and *d* contacts of the D relays, group of wires 24, *b* contacts of relay NA in their normal position, *b* contacts of relay CS (shifted), to wires 59 which as denoted in Fig. 1a transfer the digit in each order to the next higher order to the wires 50 extending in Fig. 3 to the A relays of such higher orders.

It will be noted from Fig. 5 that a 9 must be entered in the right hand or units column of the A relays to supplement the setting therein at this time, and the manner in which this 9 is entered is as follows. In Fig. 1a, relay R20 (energized in parallel with relay CS) closes a pair of *a* and *b* contacts and relay R19 remains deenergized (since it is wired in parallel with relay NA which is not energized at this time, see Fig. 7a). Accordingly, at the *b* impulse period of step 14, a circuit is traceable from the *b* impulse wire, *a* and *b* contacts of relays R19 and R20 in parallel, to connections 63 which extend (Fig. 2) to the 4 and 5 wires 25 and therethrough (Fig. 3) to the 4 and 5 relays A in the units order to enter a 9 therein.

Referring to Fig. 1c, with relay R19d deenergized and relay R20 energized, a circuit is traceable at the *b* time of step 14 from the *b* impulse wire to the *d* contacts of relay R19, *c* contacts of relay R20 (shifted) and relay R21 to ground. Relay R21 opens its *c* contacts and these will now remain open throughout the remainder of the computation, so that relay R18 cannot again be energized. Similarly, relay R21 opens its *b* contacts so that relay R19 likewise will not be re-energized. This is brought about by maintaining relay R21 energized through a holding circuit from the relay, through its *a* contacts, *b* contacts of relay R11, and the right hand side of a con-contacts of relay C13. This relay, as previously explained, is repeatedly energized and is of the make-before-break type, so that when it shifts the holding circuit extends from the a contacts of R21 directly to the shifted a contacts of relay C13 to line 15. Accordingly, relay R21 will remain energized as long as relay R11 remains de-energized.

Referring now to Fig. 1b, relay CB16 through its c contacts completes a circuit through the c contacts of the 1 relay CT2 to energize the 1 relay P2, as before. This circuit is completed during the a period of step 14, then at the b period of step 14 a circuit is traceable from the b impulse wire, c contacts of relay R5, b contacts of relay R18, wire 55, b contacts of the 1 relay P2 to energize the 1 relay CT2, which will hold through its a contacts and also through its b contacts.

At the same time a circuit branches from wire 55, through the d contacts of the 1 relay P2 (now shifted), wire 64, b contacts of 1 relay RO2, f contacts of 8 relay RO2, e contacts of 4 relay RO2, f contacts of 2 relays RO2 to the 1 socket 57, thence through connection 58 (Fig. 1a) to the 7 socket 37 and relay S7 to ground.

Incidently, the shifting of the d contacts of the 1 relay P2 (Fig. 1d) has broken the previously traced holding circuit which extends through connection 39 (Fig. 1a) to the relay S8, so the latter is now deenergized and in its stead relay S7 is energized to effect a shift in the location of the so-called column split, that is, by shifting of the contacts of relay S7 the tens carry circuits will extend from column 10, to column 9, to column 8, to column 7, but will not continue beyond this column. This splitting is graphically indicated in Fig. 5 by the line designated SP which represents the initial split between columns 7 and 8 throughout steps 0, 11, 12 and 13 and shifting to change the split to occur between columns 6 and 7 for subsequent operations.

On the next a impulse period of step 15, a circuit is completed from the a impulse wire, through wire 65, d contacts of the 1 relay CT2, to the 1 relay RO2. This relay closes its a contacts to provide a holding circuit through wire 66, c contacts of relay R5, to the b impulse wire.

Referring to Fig. 1d, the number 1 counter had previously been advanced to represent 3 and the energization of relay CB16 at the a time of step 14 will advance it to a setting to represent 4. The circuit is specifically traceable from line 15, a contacts of relay CB16, c contacts of 1 relay CT1 (shifted), c contacts of 2 relay CT1 (shifted), c contacts of 4 relay CT1 to the 4 relay P1, which picks up its holding circuit and through its b contacts will energize the 4 relay CT1 through wire 54, a contacts of relay R5 to the b impulse wire. It also opens its c contacts to break the holding circuits for the previously energized 1 and 2 relays CT1. The 1 and 2 relays RO1 were picked up previously through d contacts of the 1 and 2 relays CT1 and held through their a contacts.

Now, when the 4 relay CT1 is energized, it breaks the holding circuits for the lower value CT1 relays, their d contacts open and interrupt the holding circuits to the 2 and 1 relays RO1, so that they drop out and the 4 relay RO1 alone remains held. The output of this counter is not effective until it has advanced seven steps and the effect of this will be explained at a later time.

During the b period of step 14, the multiplier and divisor are transferred from the C relays to the B relays in their true form, and in this connection it will be noted in Fig. 1c that the relay HNA wired in parallel with NA is not energized, as explained, so that in Fig. 2 when the a transfer impulse extending from a contacts of relay R12 is transmitted, it extends through the contacts of the relays HNA, R27, CAR and SU in their normal positions. This latter results in a direct readout of the value set on the C relays through wires 20 to the B relays (Fig. 3).

Figure 1E:
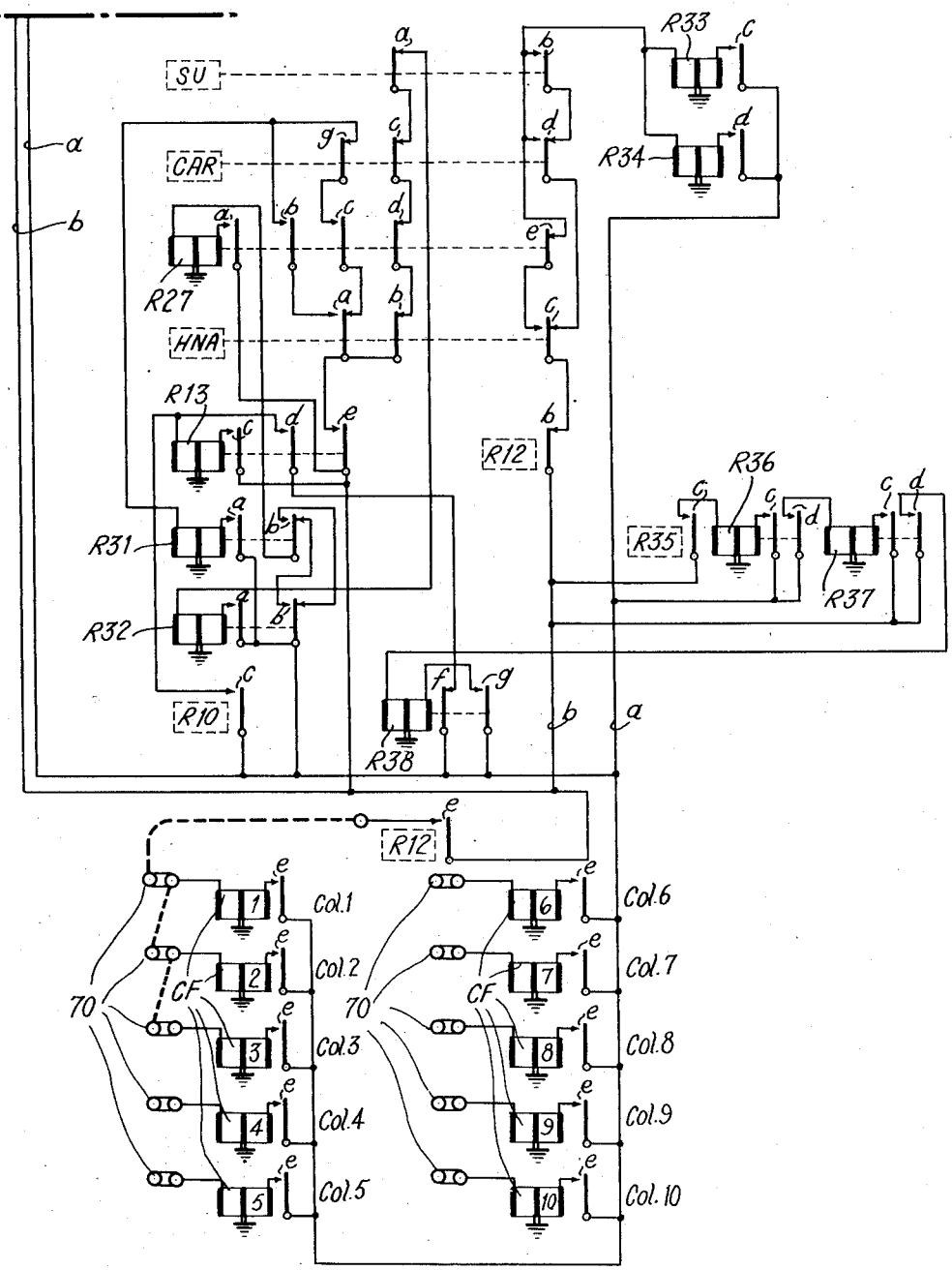

Referring to Fig. 1e, relay R10 previously energized (as explained) will have closed a pair of c contacts so that at an a impulse period following energization of relay R10 (see Fig. 7a) a circuit is completed through the c contacts of relay R10 to energize relay R13, which closes its c contacts to provide a holding circuit through the b impulse wire. A second holding circuit extends through the d contacts and f contacts of relay R38, so that relay R13 remains continuously energized through either the a or the b impulse, which make before breaking as explained.

Now, during the b period of step 14, a circuit is completed from the b impulse wire, e contacts of relay R13, b contacts of relay HNA, d contacts of relay R27, c contacts of relay CAR, a contacts of relay SU and relay R32. Relay R32 closes its a contacts to provide a holding circuit through the next a impulse period.

Step 15.—At the a impulse period, a circuit is traceable from the a impulse wire (Fig. 1e), e contacts of relay R32 (shifted), b contacts of relay R31, relay R27 to ground. This relay closes its a contacts which will hold through the b impulse wire. During the a period of step 15, summation occurs to enter the sum of the values in the A and B relays into the D relays in the manner already explained, accompanied by the transfer of the value set in the A relays into the F relays, as was also explained. The concurrent comparison of dividend and divisor results in an indication that the dividend is greater than 1½ times the divisor and, of course, greater than ½ the divisor. The specific circuits involved in this determination are as follows:

At this step in the operation, the dividend digits 2750 are represented on the A relays as the complement 7249 while the divisor is represented on the B relays in its true value. Referring to Fig. 1c, relays R33 and R34 are not energized at this time as reference to Fig. 1e will show that with relays HNA, R27, CAR and SU all in their deenergized condition, no circuit will be completed to the two first named relays. Accordingly, at the comparison period, a circuit will extend from line 15, through contacts M4d, a contacts of relays R7, R3 and R4, a contacts of relay R33 to the E wire 42 (see Fig. 4) which enters the column 1 unit in which the dividend is represented as complement 7 and the divisor is represented as 0.

Continuing the circuit according to such setting, it extends from the E wire 42, the 2 contacts of the 5 relay A (shifted), 1 contacts in the 5 relay B, 1 contacts of the 4 relay B, 1 contacts of the 4 relay A, 1 contacts of the 2 relay A (shifted), 3 contacts of the 2 relay B, 2 contacts of the 1 relay A, 2 contacts of the 1 relay B, to the L wire 43 which in Fig. 1c extends out of column 1 to wire 47L where the circuit terminates at the open a contacts of relay R34. Therefore, the relay CS does not become energized and no column shift will take place.

In the right hand section of the comparing unit the circuit is also partially completed from the b contacts of relay R33 (Fig. 1c), to the E wire 44 entering column 1 (see Fig. 4), thence through the 6 contacts of the 5 relay A (shifted), 4 contacts of the 5 relay B, 6 contacts of the 4 relay A, 8 contacts of the 2 relay A (shifted), 9 contacts of the 4 relay B, 11 contacts of the 2 relay B to the L wire 45, which in Fig. 1c extends to the wire 48L and terminates at the open c contacts of relay R34. Thus, also, the relay NA is not energized and the contacts of this relay as well as relay CS in the upper part of Fig. 2 remain in their normal position during the b period of the step 15, so that the entry in the D relays is transferred directly through wires 24, b contacts of relays NA and CS in their normal position, through wires 25 to the A relays without column shift, and incidentally transfer from the F relays is not affected. Since relay CB16 is not energized through the comparison circuit, the counting impulses through the a contacts thereof in Fig. 1d and the c contacts in Fig. 1b will not be transmitted and the counters 1 and 2 will not be advanced.

Step 16.—During the a period of step 16, the dividend complement 8042 is compared with the divisor 793, and as for step 15 the comparison circuit determines that the dividend is greater than 1½ times the divisor as well as ½ times the divisor, resulting in the non-energization of the CS and NA relays, so that during the b portion of the step the direct transfer is effected from the D relays to the A relays without column shift, and the divisor and multiplier are entered directly in the B relays.

Step 17.—During the a portion of this step, the values in the A and B relays are added and entered in the D relays. Concurrently, a comparison is made at this time. Due to the relationship of the digital values, the column shift is called for and the circuits involved are traceable as follows: With the dividend complement 8835 set up on the A relays and the divisor 793 set up on the B relays, the circuit extends in Fig. 1c through the a contacts of relay R33 in normal position, to the E wire 42 entering column 1 (see Fig. 4), 2 contacts of the 5 relay A (shifted), 1 contact of the 5 relay B, 1 contacts of the 4 relay B, 1 contacts in the 4 relay A, 1 contact of the 2 relay A (shifted), 3 contact of the 2 relay B, 2 contact of the 1 relay A (shifted), 6 contact of the 1 relay B to the 1 wire 43 extending out of column 1 (Fig. 1c), thence through the h contacts of the relay S2, to the 1 wire 42, entering column 2 (Fig. 4), 4 contacts of the 5 relay A (shifted), 2 contacts of the 5 relay B (shifted) (this column contains the dividend value 8 and the divisor value 7), 4 contacts of the 4 relay A, 6 contacts of the 4 relay B, 7 contacts of the 2 relay B (shifted), 4 contacts of the 2 relay A (shifted), 3 contacts of the 1 relay A (shifted), 1 contact of the 1 relay B to the ½ wire 43 extending out of column 2 (Fig. 1c), E contacts of relay S3, ½ wire 42 entering column 3 (see Fig. 42) (in this column the dividend setting is 3 and the divisor setting is 9), the 3 contacts of the 5 relay A, the 3 contacts of the 5 relay B (shifted), the 4 contacts of the 4 relay A, the 6 contacts of the 4 relay B (shifted), the 5 contacts of the 2 relay A (shifted), to the S wire 43 extending out of column 3 (see Fig. 1c), to the wire 47S, a contacts of relay R34 to relays CB16, which will result in energization of relays CS and R20, thus indicating that the dividend is smaller than 1½ times the divisor. It is, however, greater than ½ the divisor and with the relay setting as explained it will be found upon inspection that there will be no circuit completed to the right hand section of the comparison unit to the relay CB15, and as a result the NA relay will not be energized.

The shift called for by the comparison of step 17 is indicated on the diagram (Fig. 5a) and as a result the counter 1 will be advanced to a setting one unit higher through now familiar circuits, so that it represents 5 which, according to the coding, requires that the 4 and 1 relays CT1 are energized, that is, the 1 relay CT1 will be energized and in turn will energize the 1 relay RO1.

Just prior to energization of the latter, a circuit will extend through the wire 64 (Fig. 1b) to the b contacts of the 1 relay RO2 (shifted), b contacts of relay RO2, c contacts of 4 relay RO2, e contacts of the 8 relay RO2, to the 2 socket 57, and thence through connection 59 (Fig. 1a) to relay S6 to effect a tens carry split between columns 5 and 6.

As noted in the chart, the transfer from D relays to the A relays is effected with a column shift to the left requiring that a 9 be entered in the units or column 10 order, which is effected as explained in connection with step 14.

Step 18.—At the a period of this step, the setting in the A relays is transferred to the F relays as before, and the sum of the values in the A and B relays is transferred to the D relays. The simultaneous comparison of the dividend and divisor values results in an indication that the dividend is greater than 1½ times the divisor, so that as explained neither the CS nor the NA relays are energized so that during the b period of the step the value in the D relays is transferred without shift back to the A relays, and the divisor and multiplicand are transferred from the C relays directly to the B relays without inversion.

Step 19.—This step is a repetition of the operations of the previous step and examination of the timing diagram will indicate the particular relays energized, so that tracing of the specific circuits may be obviated.

Steps 20 and 21.—These steps are repetitions of the foregoing as a result of similar conditions of comparison, so that at the a period of step 22 of the A relay contains the setting 9461972345 and the B relays contain the divisor and multiplier in the true form.

Step 22.—During the a impulse period of this step the setting on the A relays is again transferred to the F relays and the sum of the A and B relay setting is entered in the D relays. It is to be noted that in this summation the result becomes positive because the true value of the dividend is now smaller than the divisor. The following sum is to be effected:

```
9 4 6 1 9 7 2 3 4 5
    7 9 3       4 1 9
```

At this point in the operation, there is a column split between the 5 and 6 columns, so that in the summation there will be no tens carry from the 6 to the 5, and in the addition of the figures to the left of the split it will be noted that there is a carry out of the highest order which through circuits about to be traced will cause the so-called elusive 1 to be entered into the fifth column so that the result of the summation will be 2550 for the left hand section and 72764 for the right hand section.

Referring to Fig. 1a, the summation will result in a circuit extending through wire 31 associated with column 1 which will energize relay CAR and will branch upwardly and extend through the b contacts of relays S2, S3, S4 and S5 in series to the b contacts of relay S6, which is now energized and from there extend to wire 33 in column 5 to energize the relay TC (see Fig. 2) in this order. Through the carry-on-carry circuits an impulse is also extended over to the TC relay in column 4 to effect the correct setting therein. During this step 22, the comparison unit will have ascertained that the dividend is less than 1½ the divisor but greater than ½ the divisor, calling for a shift and energizing relay CS.

As already explained, the carry impulse out of the highest or column 1 order (Fig. 1a) has energized relay CAR which shifts its e and f contacts in Fig. 2, so that the transfer from the contacts of the C relays back to the B relays will be in the form of a complement. In Fig. 1b, the energization of relay CB16 as a result of the comparison will step counter 2 one unit, so that at the b impulse period the circuit through wire 64 extends through the b contacts of the 1 relay RO2, the f contacts of the 8 relay RO2, e contacts of the 4 relays RO2, and the f contacts of the 2 relay RO2 (shifted) to the 3 socket 57 from which the circuit continues through plug connection 60 (Fig. 1a) to energize the next column split relay S5. Concurrently, in Fig. 1b the circuit branches from the 3 socket 57, through connection 61 to energize relay R1 which closes its a contacts to provide a holding circuit directly following the a impulse period. A second holding circuit extends through the b contacts of relay R1 and the b contacts of relay R35 to the b impulse line.

Accordingly, relay R1 will remain energized continuously as indicated on the timing diagram (Fig. 7b). The energization of relay R1 indicates that the machine is about to derive the third quotient digit and sets up circuits preparatory to terminating computations when this third digit has been derived. In Fig. 1e, the relay CAR has closed its d contacts so that the b impulse is transmitted through the b contacts of relay R12, c contacts of relay HNA, d contacts of relay CAR (shifted) to energize relays R33 and R34, so that on the next comparison in step 23a the contacts of these two relays in Fig. 1c will be shifted to direct circuits to the ½ wires 42 and 44. The energization of relay CAR has opened its g contacts in Fig. 1e, so that relay R31 is not picked up at this time. As a consequence, the relay R27 will not be energized. It will be noted that this relay is energized whenever the dividend is in the form of a complement and has accordingly been energized since step 14.

*Step 23.*—In step 23 cross adding takes place as before, with the result remaining positive and the comparison unit ascertaining that the dividend is greater than 1½ the divisor, so that in accordance with the now familiar conditions the apparatus proceeds through step 24 to effect a further summation and comparison. As a result of the summation, the result is still positive and the dividend is still greater than 1½ times the divisor, so the operations repeat for step 25, wherein during the a impulse period summation is repeated to attain the sum which is still positive but at this time the comparison unit finds that the dividend is less than 1½ times the divisor but greater than ½ the divisor and calls for a column shift.

At this point the third quotient digit has been derived and multiplied by the multiplier and the presetting of the machine signals that the computations have progressed as far as desired, so that now the following sequence of operations takes place.

Referring to Fig. 1b, with relay CB16 energized under control of the comparison unit, a circuit will be completed from line 15, through the b contacts of relay CB16, through the d contacts of relay R1 now closed, through relay R12 which will close its d contacts to hold through the b impulse period. In Fig. 2 relay R12 opens its closed a contacts to break the readout circuit through the contacts of the controlling relays NA, R27, CAR, SU and the contacts of the C relays, so that the value in the C relays is not transferred to the B relays during the b period of step 25.

In Fig. 2, CB16 closes its j contacts and completes a circuit from line 15, j contacts of the relay, e contacts of relay R1 now closed, relay CB9 which will open its a contacts to drop out the setting on the C relays, so that this set of relays is cleared. The opening of the a contacts of relay CB9 also effects the deenergization of relay R8. In Fig. 1e the relay R12 closes its e contacts, so that at the b impulse period a circuit is completed from the b impulse line to the plug sockets 70 interconnected so that the circuit extends through the relays CF related to the three highest orders of the computing mechanism. These will close their e contacts to a hold through the next impulse which is the a impulse for step 26. The function of these CF relays is to in effect drop out the remainder portion of the setting in the A relays and substitute 9's (0 complements) therefor.

Referring to Fig. 3, we see that the relay CF when energized will open its a contacts to disconnect the readout from the r contacts of the A relays and will close a pair of b contacts so as to connect wire 27 to the 5 and 4 wires 28 extending to the 5 and 4 relays F in Fig. 2, to thereby enter 9's in the three preselected orders.

*Rounding the result.*—At this point in the operation, the computation is completed and in following steps additional operations take place for the purpose of rounding the answer at a preselected position and the steps involved will now be set forth in detail. In Fig. 1c, the CF relay of column 1 closes a pair of g contacts which will complete a circuit from the M4d contacts to energize relay CB15 which in turn in the now familiar manner will cause energization of relay NA, so that during the b impulse period of step 26 the amount standing in the F relays will be transferred back to the A relays as indicated in the chart.

During the a period of step 26, a 5 is to be entered into a selected column position (column 9 for the present example), and this is effected through circuits explainable in Fig. 2 where a circuit is traceable at this time from the a impulse line, through g contacts of relay R1 now closed, g contacts of relay R3 which are closed in a manner to be explained presently, a plug connection 71 which is made only in the column 9 section to the 5 relay C, and this 5 relay C will close its a contacts to hold through the a contacts of CB9 for one step. A parallel circuit extends from the a impulse line to the h contacts of relays R1 and R3, plug connection 72 in each of the denominational orders to the relay SU whose function it is to cause an inverted readout of the C relays, so that on the next following b period the complementary transfer is effected as indicated on the chart concurrently with the transfer from the F relays to the A relays.

The manner in which the relay R3 was energized is as follows: Referring to Fig. 1d, in connection with which it has been explained that the counter 1 is advanced one unit for each column shift operation called for and from the chart of Fig. 7b it will be noted that seven of such shifts (seven energizations of relay CB16) have been called for prior to step 26, so that the counter relays CT1(1), CT1(2) and CT1(4) are energized to represent 7 and the RO1 relays will represent one unit less or digit 6. Therefore, at the b impulse period of step 25 a circuit is traceable in Fig. 1d from the b impulse wire, a contacts of re-relay R5, wire 54, d contacts of relay P1 (shifted), wire 73, b contacts of the 1 relay RO1, f contacts of the 8 relay RO1, e contacts of the 4 relay RO1 (shifted), e contacts of the 2 relay RO1 (shifted), to the 7 socket 52 and then through the plug connection 53 (Fig. 1b) to relay R3 and to ground. The relay will set up a holding circuit through the following a impulse and a second holding circuit through its c contacts and the e contacts of relay R11. At the same time, that is, at the b impulse period of sep 25 a circuit is set up through counter 2 extending out of the 4 socket 57 (Fig. 1b), through connection 62 to energize relay R4 which holds through the next impulse and through its c contacts has a second holding circuit through the e contacts of relay R11 and the b impulse.

Accordingly, relays R3 and R4 will be held until relay R11 next operates. Relays R3 and R4 open their a contacts at the bottom of Fig. 1c to interrupt further comparing circuits. It may be that due to the size and digital value of the factors set up (within the capacity of the machine) that relay R4 will be energized during an earlier step than relay R3, in which case the initial impulse through the a contacts of relay R4 will shift to energize relay CB16 directly and through the contacts of the latter energize the column shift relay CS, so that at each subsequent step until relay R3 is picked up the last amount would be transferred with a column shift one or more times to position the ultimate result in the A relays with respect to the decimal point.

Step 27.—Referring to Fig. 1b, closure of the d contacts of relay R3 will energize the relay R35 through the c contacts of relay R1 through an a impulse. Relay R35 will hold through its a contacts and will open its b contacts to drop out the holding circuit for relay R1. At the a impulse period of step 27 summation will take place as indicated in the chart accompanied by transfer of the setting from the A relays to the F relays. In the summation operation it will be noted that the column split relays S2 to S10 in Fig. 1a are all deenergized, so that there is a fugitive 1 transfer out of the highest order which will extend from wire 31 in such order serially through the b contacts of the lower orders of the S relays to the wire 33 in the units order, where it will add a 1. At the b impulse period, the D relays will transfer back to the A relays the now rounded result (complementary form), and following this one more step takes place during whose a impulse period the amount in the A relays is transferred to the D and F relays.

Referring to Fig. 1e, relay R35 which was energized as step 26 closes a pair of c contacts to energize relay R36 at the b period of step 26 to be held through its c contacts during the following a period, and through its d contacts energize relay R37 during the a period of step 27. Through its c contacts relay R37 holds through the a period of step 28 and through its d contacts will energize relay R38 which in turn through its g contacts will hold during the b period of step 28. Now, when relay R38 opens its f contacts, it will break the holding circuit through relay R13. In Fig. 1b relay R38 closes a pair of e contacts which complete a circuit from the a impulse line to energize relay R5 which will hold through its b contacts during the following b impulse period. Relay R5 opens its c contacts to drop out the holding circuit in counter 2, so this counter is clear. It also opens a pair of a contacts in Fig. 1d to likewise clear counter 1. Relay R5 opens its d contacts (Fig. 2) to clear the D relays so that the only values set up are now contained in the F relays.

In Fig. 3 relay R5 closes its g contacts to energize relay R6 which will hold through its b contacts and the right hand a contacts of relay CB12. The incidental opening of a contacts of relay R6 will prevent further energization of relay CB12, so that the latter remains with its contacts in normal position where in Fig. 2 its b contacts accordingly remain closed to maintain the holding circuit to the F relays upon which the final result is set. Thus, at the b impulse period of step 28, computing operations have been completed and no further transfers will take place, so that rotation of the circuit breakers M may be interrupted at any point thereafter.

In Fig. 2 each set of F relays has associated therewith a group of readout-and-invert contacts generally designated c interconnected as shown and wired to a set of ten lamps 75. A switch 76, when closed, will direct current from line 15, through the c circuit network to light the lamp 75 corresponding to the true value set on the F relays. This constitutes a simplified form of readout device and it will, of course, be understood that other forms of current responsive devices may be operated through the inverting contacts c.

*Straight multiplying and dividing*

It is obvious that, if a quotient of two factors is desired, the multiplier field of the card 10 (Fig. 1) may be punched to represent a multiplier of 1 and the procedure will be as already explained to obtain for example, $$\frac{518}{793} \times 1 = .653$$

for a three place quotient. Similarly, if the divisor field is punched to represent a divisor of 1, the result will be a product. For example, $$\frac{518}{1} \times 793 = 410774$$

To make it unnecessary that a 1 be punched in the record card when straight multiplying or dividing operations are required, a switch 80 (Fig. 1) is provided which, when set in "Divide" position, will transmit an impulse from contacts M3 (timed at "1") to wire 81 and the 10 relay EB. When the switch is set in "Mutiply" position, it will transmit an impulse from contacts M3 to wire 82 and the 1 relay EB.

While there have been shown and described and pointed out the fundamental novel features of the invention as applied to a single modification, it will be understood that various omissions and substitutions and changes in the form and details of the device illustrated and its operation may be made by those skilled in the art without departing from the spirit of the invention. It is the intention therefore to be limited only as indicated by the scope of the following claims.

What is claimed is:

1. In a calculating machine, a first entry receiving device comprising a set of four relays, each representing a different digit and which by energization singly or in combination may represent all of the digits 1 to 9, a readout device effective to read out the digit standing in the relays increased by one, a second entry receiving device controlled by said readout device to receive the increased digit, record controlled means for causing repeated operation of said readout device a selected number of times from one to nine, and means effective between each of said readout operations for transferring the digit in the second entry receiving device back to the set of relays.

2. In a calculating machine, a set of denominationally ordered A relays, a set of denominationally ordered B relays, a set of denominationally ordered D relays, each set being energizable to represent an entered value, a plurality of groups of contacts, one group for each set of relays, adjustable by their respective sets to represent the value entered therein, circuit connections interconnecting the contacts related to the A and B sets of relays in accordance with the table of addition, said interconnections extending to the set of D relays, circuit connections extending from the contacts of the D relays to the A relays, means for initially energizing each of said A and B sets of relays in accordance with a value, means for emitting a pair of successive current impulses, the first impulse being directed through the adding interconnections to energize the D relays in accordance with the sum of the values set in the A and B relays, the second impulse being directed through the contacts of the D relays to energize the A relays in accordance with the setting of the D relays, holding circuit connections for the A and B relays to hold their initial settings, and means for breaking said holding circuits during the period of said second impulse whereby only such of the A relays as are not required in the representation of the new value will be deenergized.

3. The invention set forth in claim 2 in which a second group of contacts is provided for each of the sets of A and B relays and adjusted thereby to represent the entered values, comparing circuit connections extending through said second groups of contacts for ascertaining a plurality of different conditions of relative magnitude between the two represented values, and means controlled thereby upon occurrence of one condition of relative magnitude for preventing the energization of the A relays in response to the said second impulse.

4. The invention according to claim 3 in which the emitting means transmits a current impulse through said comparing contacts simultaneously with the first of said pair of successive impulses, whereby comparison and summation of the values set in the A and B relays is simultaneously effected.

5. The invention set forth in claim 2 in which comparing mechanism is provided and controlled by the A and B relays jointly to ascertain a plurality of different conditions of relative magnitude between the two represented values, and means controlled thereby upon occurrence of one condition of relative magnitude for preventing the energization of the A relays in response to said second impulse.

6. In a calculating machine, a dividend receiving device, a divisor receiving device, means for entering a factor in each, comparing means for comparing the dividend and divisor for relative magnitude, means for causing repeated operation of said comparing means, a result receiving means, means for causing repeated algebraic summation of the amounts standing in the dividend and divisor devices, and entry of the result in said result receiving means, there being a summation operation effected concurrently with each comparing operation, column shift devices, means controlled by said result receiving means for repeatedly transferring the result therein to the dividend receiving device through said column shift devices, following each summation, and means controlled by the comparing means for controlling the column shift devices to direct the transferred result in accordance with the relative magnitude of the compared factors.

7. In a calculating machine, a dividend receiving device, a divisor receiving device, means for entering a factor in each, comparing means for comparing the dividend for relative magnitude thereof with respect to 1½ times the divisor and ½ the divisor, a result receiving device, means for causing algebraic summation of the amounts standing in the dividend and divisor devices and entry of the result in said result receiving device, means for causing repeated, concurrent operation of said comparing and said summation means, column shift devices, means controlled by said result receiving device for repeatedly transferring the result therein to the dividend receiving device through said column shift devices following each summation and comparison, while retaining relative denominational allocation, and means controlled by said comparing means when the dividend is less than 1½ times the divisor but greater than ½ the divisor for controlling the transfer means and the column shift devices so as to transfer the result with a denominational displacement.

8. In a calculating machine, a dividend receiving device, a divisor receiving device, means for entering a factor in each, comparing means for comparing the dividend for relative magnitude thereof with respect to 1½ times the divisor and ½ the divisor, a result receiving device, means for causing algebraic summation of the amounts standing in the dividend and divisor devices and entry of the result in said result receiving device, means for causing repeated concurrent operation of said comparing and said summation means, column shift devices, means controlled by said result receiving device for repeatedly transferring the result therein to the dividend receiving device through said column shift devices following each summation, and comparison while retaining relative denominational allocation, and means controlled by said comparing means when the dividend is less than ½ the divisor for preventing the operation of the transfer means.

9. In a calculating machine, a dividend receiving device, a divisor receiving device, means for entering a factor in each, comparing means for comparing the dividend for relative magnitude thereof with respect to 1½ times the divisor and ½ the divisor, a result receiving device, means for causing algebraic summation of the amounts standing in the dividend and divisor devices and entry of the result in said result receiving device, means for causing repeated concurrent operation of said comparing and said summation means, column shift devices, means controlled by said result receiving device for repeatedly transferring the result therein to the dividend receiving device through said column shift devices following each summation and comparison while retaining relative denominational allocation, a storage device, means effective concurrently with each summation for transferring the dividend to said storage device, means controlled by said comparing means when the dividend is less than ½ the divisor for preventing operation of said first named transfer means and for causing the amount in the storage device to be entered into the dividend receiving device through said column shift device so as to transfer the said amount with a denominational displacement.

10. In a calculating machine, a dividend receiving device, a divisor receiving device, means for entering a factor in each, comparing means for comparing the dividend for relative magnitude thereof with respect to 1½ times the divisor and ½ the divisor, a result receiving device, means for causing algebraic summation of the amounts standing in the dividend and divisor devices and entry of the result in said result receiving device, means for causing repeated concurrent operation of said comparing and said summation means, column shift devices, means controlled by said result receiving device for repeatedly transferring the result therein to the dividend receiving device through said column shift devices following each summation and comparison while retaining a relative denominational allocation, and means controlled by said comparing means when the dividend bears one relationship to the divisor for controlling the transfer and column shift devices to effect a transfer with a column shift, and when the dividend bears another relationship to the divisor for controlling the transfer and column shift devices to effect a transfer without a column shift.

11. In a calculating machine, a dividend receiving device, a divisor receiving device, a multiplier receiving device, means for entering a factor in each, a result receiving device, column shift devices, a first summation means controlled jointly by said dividend and divisor devices for obtaining the algebraic sum of the dividend and divisor and entering the remainder in said dividend receiving device through said column shift devices, a second summation means controlled jointly by said result and multiplier devices for obtaining the algebraic sum of the amount in the result and multiplier devices and entering the result in the result receiving device through said column shift devices, means for causing repeated concurrent operation of both said summation means whereby successive remainders are entered into said dividend receiving device and successive results are entered into said result device, said repeated operations effecting reduction of the dividend and a corresponding increase of the multiplier, and means effective upon reduction of the dividend to a predetermined extent terminating said summation operations, whereupon the result device will represent the result of the multiplier times the quotient of the other two factors to a predetermined extent.

12. In a calculating machine, a dividend receiving device, a divisor receiving device, a multiplier receiving device, means for entering a factor in each, a result receiving device, means jointly controlled by the dividend and divisor devices for causing subtraction of the divisor from the dividend and entry of the remainder into said dividend receiving device, means controlled jointly by the multiplier and result devices for causing addition of the multiplier to itself and entry of the sum into said result device, means for causing repeated concurrent operation of said subtracting and adding means, and means for terminating said operation when the remainder becomes zero, whereby the sum in the result device will represent the product of the multiplier times the quotient of the other two factors; the quotient of the multiplicand and divisor, if the initial multiplier is unity; and the product of the multiplicand and multiplier, if the initial divisor is unity.

13. In a calculating machine, a dividend receiving device, a divisor receiving device, a multiplier receiving device, means for entering a factor in each, a result receiving device, means jointly controlled by the dividend and divisor devices for causing subtraction of the divisor from the dividend and entry of the remainder into said dividend receiving device, means controlled jointly by the multiplier and result devices for causing addition of the multiplier to itself and entry of the sum into said result device, means for causing repeated concurrent operation of said subtracting and adding means, and means for terminating said operation when the dividend has been reduced a predetermined denominational extent, whereby the sum in the result device will represent the product of the multiplier times the quotient of the other two factors carried out to said predetermined extent.

14. In a dividing machine, means settable to represent a dividend, means settable to represent a divisor, summation devices controlled by said dividend and divisor settable means, for obtaining the algebraic sum of the two factors, means for causing repeated operation of said summation devices, column shift devices for effecting a shift of the denominational relationship of the factors, comparing devices controlled by the dividend and divisor settable means concurrently with control of said summation devices, to ascertain the relative magnitude of the factors, and means controlled thereby when the dividend is less than 1½ times the divisor for controlling the column shift devices to incur a change in the denominational relationship of the factors prior to the next following summation.

15. In a dividing machine, means settable to represent a dividend, means settable to represent a divisor, summation devices controlled by said dividend and divisor settable means, for obtaining the algebraic sum of the two factors, means for causing repeated operation of said summation devices, column shift devices for effecting a shift of the denominational relationship of the factors, separate comparing devices independent of said summation devices controlled by the dividend and divisor settable means concurrently with control of said summation devices to ascertain the relative magnitude of the factors, and means controlled thereby when the dividend is less than ½ the divisor for preventing the concurrent summation and for controlling the column shift devices to incur a change in the denominational relationship of the factors prior to the next following summation.

16. In a dividing machine, means settable to represent a dividend, means settable to represent a divisor, one of said settings being in the form of a complement and the other in the form of a true number, means for comparing said settings, column shift devices, means for effecting algebraic summation of said factors and entry of the sum into the dividend settable means through said column shift devices, control devices for causing concurrent operation of the comparing and summation means, and means controlled by the comparing means for adjusting the column shift devices prior to entry of said sum into the dividend settable means.

17. In a dividing machine, means settable to represent a dividend, means settable to represent a divisor, means for comparing a plurality of the highest orders of one factor with a plurality of the highest orders of the other for relative magnitude, algebraic summation devices, column shift devices, means for effecting repeated operation of said summation devices to algebraically combine the factors, means for rendering the comparing means effective concurrently with each summation operation, and means controlled thereby if the dividend orders compared are less than 1½ times the divisor orders compared, for operating said column shift devices prior to the next following summation operation.

18. In a calculating machine, a first set of value representing relays, a second set of value representing relays, means for emitting a succession of electrical impulses of overlapping duration, means controlled by the first set of relays in response to a first impulse for energizing relays of the second set, and holding the same for the period of said first impulse, means controlled by the energized relays of the second set in response to a second impulse for maintaining the relays energized for the period of the second impulse, further means controlled by the said energized relays of the second set in response to said second impulse for energizing relays of the first set and holding the same for the period of the second impulse, and means controlled by the energized relays of the first set in response to a third impulse for maintaining the relays energized for the period of the third impulse.

19. In a calculating machine, a first set of value representing relays, means for entering a value therein, a second set of value representing relays, means for emitting a succession of electrical impulses of overlapping duration, means controlled by the first set of relays in response to the first and alternate impulses for effecting selective energization of the relays of the second set for the duration of said impulses, means controlled by the second set of relays in response to the second and alternate impulses for holding the relays of the second set energized and for effecting selective energization of the relays of the first set for the duration of said impulses, and means controlled by the relays of the first set in response to the third and alternate impulses for holding the relays of the first set energized for the duration of said impulses, whereby for the first and alternate impulses there will be a value transfer from the first to the second set of relays and for the second and alternate impulses there will be a value transfer from the second to the first set of relays, the overlap of the impulses being effective to maintain any relay of a set continuously energized if the same is repeatedly energized during its related impulsing periods.

20. The invention set forth in claim 19 in which a third set of value representing relays is provided, means for entering a value therein, comparing means controlled jointly by the first and third sets of relays in response to the said first and alternate impulses for comparing the values in the related relays for relative magnitude, and means controlled thereby when a predetermined relationship is ascertained in response to any of said comparing impulses for rendering the next succeeding impulse ineffective, whereby the value in the second set of relays will not be transferred during said next impulse period.

21. In a calculating machine, a dividend receiving device, a divisor receiving device, means for entering a dividend and divisor therein, means jointly controlled by said receiving devices for repeatedly combining said factors algebraically and setting up the result in the dividend device, column shift devices, comparing means jointly controlled by said receiving devices concurrently with each combining operation for comparing the factors for relative magnitude, means controlled thereby when a predetermined relationship is ascertained for operating said column shift devices to cause the subsequent combining operation to combine the factor with a denominational shift relationship, means controlled by the comparing means for counting the number of column shift operations called for, and means controlled by said counting means for terminating the repeated combining operations when a selected number of column shifts has been counted.

22. In a calculating machine, a dividend receiving device, a divisor receiving device, means for entering a dividend and divisor therein, means jointly controlled by said receiving devices for repeatedly combining said factors algebraically and setting up the result in the dividend device, column shift devices, comparing means jointly controlled by said receiving devices, concurrently with each combining operation, for comparing the factors for relative magnitude, means controlled thereby when the dividend is less than 1½ times the divisor, for operating said column shift devices to cause the subsequent combining operation to combine the factor with a denominational shift relationship, means controlled by the comparing means for counting the number of column shift operations called for, and means controlled by said counting means for terminating the repeated combining operations when a selected number of column shifts has been counted.

23. In a calculating machine, a set of relays settable to represent a dividend digit, a set of relays settable to represent a divisor digit, contacts adjusted by each of the relays, circuit connections interconnecting the contacts thereof, an input wire, four output wires, said connections being arranged so that, if the dividend digit is equal to ½ the divisor digit, the input wire is connected to the first of the output means; if the dividend digit is less than ½ the divisor digit by .5, the input wire is connected to the second output wire; if the dividend is greater than ½ the divisor, the input wire is connected to the third output wire; and if the dividend is less than ½ the divisor by more than .5, the input wire is connected to the fourth output wire, and means for transmitting an electrical impulse to said input wire and through said connections to one of the output wires in accordance with the said comparison conditions.

24. In a calculating machine, a set of relays settable to represent a dividend digit, a set of relays settable to represent a divisor digit, a first set of contacts adjusted by the relays and interconnected in accordance with the relationship of the dividend to 1½ times the divisor, a second set of contacts adjusted by the relays and interconnected in accordance with the relationship of the dividend to ½ the divisor, means for transmitting an electrical impulse, simultaneously through both sets of contacts, and current responsive devices controlled through said connections, in response to said impulse, when the dividend bears a predetermined relationship to 1½ times and ½ the divisor.

25. In a calculating machine, a plurality of relays on which all digital values are represented electrically by the energization of said relays in combinations of one or two relays, contacts operated by said relays to take a different relative adjustment for each digit representation, a set of storage relays, circuit connections between the contacts and said storage relays, means for transmitting impulses through said connections, the adjustment of the contacts serving to direct the impulses to energize the storage relays to represent a digit one unit higher than the value set on the contacts, means controlled by the storage relays for transferring the increased digital value to the first named relays, said transfer causing erasure of a previous digital setting of the first named relays and effecting a new setting representing the higher digit, record controlled means, means controlled thereby for causing said impulse transmitting and transferring means to operate alternately for a selected number of times, and means effective upon completion of the last of said transferring operations for transmitting impulses through said connections to energize the storage relays to represent the complement of the last value set on the contacts.

26. In a calculating machine of the class described, a pair of like entry receiving devices, a readout device for each, each entry receiving device including a plurality of digits representing magnets energizable in the same manner in each to represent any given digit, both said entry receiving devices initially standing at zero, means for emitting a series of successive but overlapping electrical impulses, circuit connections controlled by the readout device of the first entry receiving device for directing the first and alternate impulses to energize the magnets of the second entry receiving device in accordance with the digit standing in the first device plus one, means controlled by the readout device of the second entry receiving device for directing the second and alternate impulses to energize the magnets of the first entry receiving device in correspondence with the magnets energized in the second entry receiving device, said entry receiving devices being arranged and constructed so that an entry made therein will supersede the prior entry, contact means to render said emitting means effective, which comprises means for sensing a record card having a column of spaced positions, one position for each of the digits 1 to 9, in one of which a designation may be made to represent a selected digit, said sensing means sensing the positions in the order 9, 8, 7, 6, 5, 4, 3, 2, 1, means controlled by the sensing means upon sensing a designation for rendering the emitting means effective, and means for terminating said effectiveness after a pair of impulses for the digit sensed, and a pair of impulses for each lower digit, has been emitted, whereby the first entry receiving device will represent the value of the designation sensed.

HANS P. LUHN.

REFERENCES CITED

The following references are of record in the file of this patent:

UNITED STATES PATENTS

| Number | Name | Date |
|---|---|---|
| 2,282,028 | Bryce | May 5, 1942 |
| 2,298,263 | Chick | Oct. 6, 1942 |
| 2,339,616 | Chase | Jan. 18, 1944 |
| 2,386,763 | Williams | Oct. 16, 1945 |